US011467706B2

(12) United States Patent
Dewitt

(10) Patent No.: US 11,467,706 B2
(45) Date of Patent: Oct. 11, 2022

(54) MULTIPURPOSE MEDIA PLAYERS

(71) Applicant: THOMAS M. MAJCHROWSKI & ASSOCIATES, INC., Orange, CA (US)

(72) Inventor: Keri Dewitt, Orange, CA (US)

(73) Assignee: THOMAS M. MAJCHROWSKI & ASSOCIATES, INC., Orange, CA (US)

( * ) Notice: Subject to any disclaimer, the term of this patent is extended or adjusted under 35 U.S.C. 154(b) by 208 days.

(21) Appl. No.: 16/723,591

(22) Filed: Dec. 20, 2019

(65) Prior Publication Data
US 2020/0133419 A1 Apr. 30, 2020

Related U.S. Application Data

(63) Continuation of application No. 15/849,349, filed on Dec. 20, 2017, now Pat. No. 10,514,815, which is a continuation of application No. 14/054,242, filed on Oct. 15, 2013, now Pat. No. 9,864,478, which is a continuation of application No. 13/525,171, filed on Jun. 15, 2012, now Pat. No. 8,577,683, which is a continuation of application No. 11/816,090, filed as
(Continued)

(51) Int. Cl.
| | |
|---|---|
| G06F 3/00 | (2006.01) |
| G06F 3/048 | (2013.01) |
| H04N 21/472 | (2011.01) |
| G11B 27/034 | (2006.01) |
| G11B 27/34 | (2006.01) |

(52) U.S. Cl.
CPC ............ *G06F 3/048* (2013.01); *G11B 27/034* (2013.01); *G11B 27/34* (2013.01); *H04N 21/47205* (2013.01)

(58) Field of Classification Search
CPC ... H04N 21/854; H04N 21/8543; G06F 21/10
See application file for complete search history.

(56) References Cited

U.S. PATENT DOCUMENTS

| | | |
|---|---|---|
| 5,166,804 A | 11/1992 | Takahashi |
| 5,237,648 A | 8/1993 | Mills et al. |
| (Continued) | | |

FOREIGN PATENT DOCUMENTS

WO 0073914 A1 12/2000

OTHER PUBLICATIONS

H. Schulzrinne, et al., "Real Time Streaming Protocol (RTSP)", RFC 2326 (Apr. 1998), 84 pages.
(Continued)

*Primary Examiner* — Daniel Abebe
(74) *Attorney, Agent, or Firm* — Brooks Kushman P.C.

(57) ABSTRACT

Disclosed are Multipurpose Media Players that enable users to create transcriptions, closed captions, and/or logs of digitized recordings, that enable the presentation of transcripts, closed captions, logs, and digitized recordings in a correlated manner to users, that enable users to compose one or more scenes of a production, and that enable users to compose storyboards for a production. The multipurpose media players can be embodied within Internet browser environments; thereby providing high availability of the multipurpose players across software platforms, networks, and physical locations.

20 Claims, 17 Drawing Sheets

Related U.S. Application Data application No. PCT/US2006/005300 on Feb. 14, 2006, now Pat. No. 8,204,750.

(60) Provisional application No. 60/653,057, filed on Feb. 14, 2005.

(56) References Cited

U.S. PATENT DOCUMENTS

| | | | |
|---|---|---|---|
| 5,809,145 A * | 9/1998 | Slik | G06F 21/10 705/52 |
| 5,819,004 A | 10/1998 | Azadegan et al. | |
| 5,838,906 A | 11/1998 | Doyle et al. | |
| 5,856,958 A * | 1/1999 | Yokota | G11B 27/034 369/124.09 |
| 5,966,495 A | 10/1999 | Takahashi et al. | |
| 5,991,399 A * | 11/1999 | Graunke | G06F 21/10 380/228 |
| 6,263,313 B1 | 7/2001 | Milsted et al. | |
| RE37,342 E | 8/2001 | Washino et al. | |
| 6,414,686 B1 | 7/2002 | Protheroe et al. | |
| 6,418,421 B1 * | 7/2002 | Hurtado | H04L 9/0822 705/54 |
| 6,505,153 B1 | 1/2003 | Van Thong et al. | |
| 6,567,980 B1 | 5/2003 | Jain et al. | |
| 6,674,994 B1 | 1/2004 | Fell et al. | |
| 6,710,785 B1 | 3/2004 | Asai et al. | |
| 6,763,177 B1 | 7/2004 | Abe et al. | |
| 6,771,285 B1 | 8/2004 | McGrath et al. | |
| 6,877,010 B2 | 4/2005 | Smith-Semedo et al. | |
| 6,965,723 B1 | 11/2005 | Abe et al. | |
| 7,043,137 B2 | 5/2006 | Slone | |
| 7,149,788 B1 | 12/2006 | Gundla et al. | |
| 7,366,979 B2 | 4/2008 | Spielberg et al. | |
| 7,849,160 B2 | 12/2010 | Hayward | |
| 8,036,889 B2 | 10/2011 | Carus et al. | |
| 8,682,672 B1 | 3/2014 | Ha et al. | |
| 2001/0051958 A1 | 12/2001 | DeVries et al. | |
| 2002/0097692 A1 | 7/2002 | Ruotoistenmaki | |
| 2002/0123883 A1 | 9/2002 | Jackson et al. | |
| 2002/0133513 A1 | 9/2002 | Townsend et al. | |
| 2002/0161578 A1 | 10/2002 | Saindon et al. | |
| 2002/0161804 A1 | 10/2002 | Chiu et al. | |
| 2003/0086409 A1 | 5/2003 | Karas et al. | |
| 2004/0096188 A1 | 5/2004 | Kageyama | |
| 2004/0117500 A1 | 6/2004 | Lindholm et al. | |
| 2004/0177317 A1 | 9/2004 | Bradstreet | |
| 2004/0247284 A1 | 12/2004 | Yamasaki | |
| 2005/0033758 A1 | 2/2005 | Baxter | |
| 2005/0053352 A1 | 3/2005 | McKain et al. | |
| 2005/0188403 A1 | 8/2005 | Kotzin | |
| 2005/0228663 A1 | 10/2005 | Boman et al. | |
| 2006/0053468 A1 | 3/2006 | Sudoh et al. | |
| 2006/0098941 A1 | 5/2006 | Abe et al. | |
| 2006/0161872 A1 | 7/2006 | Rytivaara et al. | |
| 2006/0179403 A1 | 8/2006 | Kirkpatrick | |
| 2006/0204213 A1 | 9/2006 | Slone | |
| 2006/0224940 A1 | 10/2006 | Lee | |
| 2007/0172208 A1 | 7/2007 | Okada et al. | |
| 2007/0283236 A1 | 12/2007 | Sugiura et al. | |
| 2010/0080384 A1 | 4/2010 | Lee | |

OTHER PUBLICATIONS

Excerpt from Collins English Dictionary, HarperCollins Publishers, (3d Updated ED. 1994), 4 pages.
Excerpt from New Oxford American Dictionary, Oxford University Press, (3D Ed. 2010), 3 pages.
Excerpt from Microsoft Press Computer Dictionary, Microsoft Press, (3D Ed. 1997), 3 pages.
Definition of "timestamp" from Oxford English Online Dictionary (accessed Apr. 20, 2018), 1 page.
Definition of 'hyperlink from Merriam-Webster's Collegate Dictionary, Merriam-Webster, Inc. (11 ED, Copyright 2012), 3 pages.
Definition of "encloding" from Techterms.com, (updated Sep. 23, 2010), 1 page.
Excerpt from Merriam-Webster's Ninth New Collegiate Dictionary, Merriam-Webster, Inc. (1990), 3 pages.
Tanenbaum, Andrew S., "Computer Networks," (4th Ed., 2003), Prentice Hall PTR, 32 pages.
Excerpts from Paul Whitehead and James H. Russell, Wiley Publishing, Inc., "HTML: Your Visual Blueprint for Designing Webpages with HTML, CSS, and XHTML" (2005), 16 pages.
Excerpts from Ed Tittel and Stephen N. James, , IDG Books Worldwide, "HTML for Dummies" (3d Ed. 1997), 59 pages.
Excerpts from Elizabeth Castro, Peachpit Press, "HTML for the World Wide Web" (4th Ed. 2000), 20 pages.
"About Us: Society of Motion Picture & Television Engineers," accessed Jun. 7, 2018, (https://smpte.org/about), 3 pages.
Excerpt from Microsoft Press Computer Dictionary, Microsoft Press, (5th Ed. 2002), 4 pages.
Excerpt from The American Heritage College Dictionary, Houghton Mifflin Company, (3D. Ed. 2000), 3 pages.
Screenshot Print-Out of www.ietf.org/rfc/rfc2326.txt from Internet Archive Wayback Machine, (Aug. 2000), 58 pages.
Wikipedia Entry for "ZOG (hypertext)," Wikipedia, (last edited on Apr. 25, 2018), 1 page.
G. Robertson, D. McCracken, and A. Newell, "The ZOG Approach to Man-Machine Communication," Int'l. Journal of Man-Machine Studies (1981), 28 pages.
Terry K. Borsook and Nancy Higginbotham-Wheat, "A Psychology of Hypermedia: A Conceptual Framework for R&D" (1992), 22 pages.
Richard Williams, "All in Good Timecode," Adobe Magazine (1999), 3 pages.

* cited by examiner

MEDIA IDENTIFIER WITH EMBEDDED METADATA REFERENCE
http://LibraryServer/ProjectAssets/S13909WaterFrontTrip.mpg

S13909WaterFrontTrip

{storywriters can place story line notes here} ← STORY-LINE NOTES

00:00:05:25 (Pans of Chicago skyline from the waterfront) (partly cloudy) ← LOGGING INFORMATION
[camera went through several 45-degree arc pans, with lens zoom at 100]

00:01:20:25 (camera shot cuts to line to board Ferris wheel – back ← PRODUCTION NOTE
ground noise) [camera lens zoom at 50]

00:02:05:03 (Melissa and her mom join the line to the board the Ferris
wheel)

00:02:13:15 MELISSA  Mom, can I get dizzy riding the Ferris wheel? ← TRANSCRIBED DIALOG
(tugging mom's blouse) 00:02:23:05

00:02:28:25 MELISSA'S MOM  No dear, it's like riding an elevator, except
you can see outside. 00:02:39:04

00:03:10:25 (Melissa and Melissa's mom board Ferris wheel cab, camera
follows) [camera lens zoom at 40]

00:03:19:25 MELISSA  I can't wait for it to go! (bouncing up and down in
seat) 00:03:24:01

00:03:27:17 MELISSA'S MOM  Now, just be patient. 00:03:31:00

(HYPERLINK TIME STAMPS, ACTOR NAME labels point to timestamps and names in the text)

*FIG. 3*

WRAPPER INSTRUCTION SETS

- Instruction sets that directs data processor 110 to define container 200, to start instances of the text editor and media player, and to configure communication protocols between the wrapper and these instances, including routing of user input and event handling.
- Instruction sets that directs data processor 110 to coordinate the opening of the text data file by the text editor and the corresponding media file by the media player.
- Instruction sets that direct data processor 110 to the data processor to present to the user two or more classes of information, each class capable of having a plurality of members, and to detect a pre-selected user input command for each class member and to insert (via the text editor instructions) a text representation of a member in the data file upon detection of the pre-selected user input command for the member.
- Instruction sets that direct data processor 110 to associate a selected character pattern to at least one class, and to apply the selected character pattern to the entered text representation for each member of the at least one class.
- Instruction sets that direct data processor 110 to receive a pre-selected user input command to add a new member to a class, to receive a pre-selected user input command to delete a member from a class, to receive a pre-selected user input command to add a class, to modify the classes and class membership according to these user input commands, to obtain a group of classes and the members of the class from a configuration file; and to save a group of classes and class membership to a configuration file.
- Instruction sets that direct data processor 110 to detect a pre-selected user input indicating the desire to insert a time stamp, to request a time-code representative of the current playing time from the media player, to generate the time stamp from at least the provided time-code representation, and to generate a request to the text editor to insert the time stamp and corresponding hyperlink.
- Instruction sets that direct data processor 110 to handle a hyperlink handling request from the text editor and to generate a request to the media player to set the current playing time to the time code indicated by the time-stamp hyerlink.
- Instructions sets to direct data processor 110 to e-mail and/or FTP a text data file.

TEXT EDITOR INSTRUCTION SETS

- Instruction sets that direct data processor 110 to receive keystrokes from the keyboard, as routed through the wrapper, to store representations of the keystrokes in a text data file, to display representations of the keystrokes, the time-stamps, hyperlinks, and inserted class members on the display, and to recognize activation of time-stamp hyperlinks and pass to the wrapper for handling.
- API instruction sets that direct data processor 110 to control the operation of the text editor via requests from the wrapper, to perform such tasks as: inserting a text string into the current cursor location and creating hyperlink for selected inserted text strings; opening a specified text data file.

MEDIA PLAYER INSTRUCTION SETS

- Instruction sets that directs data processor 110 to present (e.g., play) the digital media file to the user, and to enable the user to rewind, pause, play, and fast-forward through the digital media file; and to track the current playing time of the media file.
- API instruction sets that direct data processor 110 to control the operation of the media player via requests from the wrapper, to perform such tasks as providing the time code of the current playing time and the name of the media file, and of opening a specified media file and setting the playing time of the media file to a specified time code.

COMPUTER READABLE MEDIUM  FIG. 5

FIG. 6

```
Scene Westwind EDL EDL[1] Notepad
File Edit Format View Help
TITLE: Westwind EDL
FCM: NON-DROP FRAME
FCM: DROP FRAME
001  Edit-768 AA/V  C         02:00:56:00 02:01:00:04 01:00:00:00 01:00:04:06
* FROM CLIP NAME:   * imported clip
002  Edit-768 AA/V  C         02:01:15:04 02:01:31:14 01:00:04:06 01:00:20:20
* FROM CLIP NAME:   * imported clip
003  Edit-768 AA/V  C         02:01:39:28 02:02:38:18 01:00:20:20 01:01:19:12
* FROM CLIP NAME:   * imported clip
004  Edit-768 AA/V  C         02:02:46:05 02:03:14:14 01:01:19:12 01:01:47:25
* FROM CLIP NAME:   * imported clip
005  Edit-768 AA/V  C         02:03:27:05 02:03:29:22 01:01:47:25 01:01:50:13
* FROM CLIP NAME:   * imported clip
006  Edit-768 AA/V  C         02:03:51:11 02:04:21:04 01:01:50:13 01:02:20:08
* FROM CLIP NAME:   * imported clip
007  Edit-768 AA/V  C         02:07:14:26 02:07:57:07 01:02:20:08 01:03:02:22
* FROM CLIP NAME:   * imported clip
008  Edit-768 AA/V  C         02:08:10:08 02:08:29:27 01:03:02:22 01:03:22:13
* FROM CLIP NAME:   * imported clip
009  Edit-768 AA/V  C         02:08:41:25 02:09:26:22 01:03:22:13 01:04:07:12
* FROM CLIP NAME:   * imported clip
010  Edit-768 AA/V  C         02:09:37:08 02:10:28:09 01:04:07:12 01:04:58:14
* FROM CLIP NAME:   * imported clip
011  Edit-768 AA/V  C         02:10:47:07 02:13:09:16 01:04:58:14 01:07:20:28
* FROM CLIP NAME:   * imported clip
012  Edit-768 AA/V  C         02:13:25:11 02:14:11:11 01:07:20:28 01:08:07:00
* FROM CLIP NAME:   * imported clip
013  Edit-768 AA/V  C         02:14:29:04 02:15:03:21  01:08:07:00 01:08:41:19
* FROM CLIP NAME:   * imported clip
014  Edit-768 AA/V  C         02:15:16:04 02:15:43:02 01:08:41:19 01:09:08:19
* FROM CLIP NAME:   * imported clip
015  Edit-768 AA/V  C         02:16:04:25 02:16:15:27 01:09:08:19 01:09:19:22
* FROM CLIP NAME:   * imported clip
016  Edit-768 AA/V  C         02:16:26:22 02:16:47:11 01:09:19:22 01:09:40:13
* FROM CLIP NAME:   * imported clip
```

FIG. 8

SCENE EDITOR WRAPPER INSTRUCTION SETS

- Instruction set that directs data processor 110 to define the container having display areas 210, 320, 330, and the outer shells for the view screen and edit screen of the Scene Editor, to start an instance of the media player, and to configure communication protocols between the wrapper and the instance, including routing of user input and event handling.
- Instruction set that directs data processor 110 to open a selected scene file for viewing and for editing, to set up a scene-clips list and display its contents in display area 320 (view screen and edit screen), and to set up a preparation list (edit screen) and display its contents in display area 330.
- Instruction set that directs the processor 110 to detect an input from the user to highlight a clip in the preparation list, and to place the clip in a highlighted state in response to detecting the input.
- Instruction set that directs the processor 110 to receive an input from the user to transfer a highlight clip in the preparation list to the scene-clips list, and to transfer the highlighted clip in response to the detecting input.
- Instruction set that directs the processor 110 to detect the filename of a base media file input from a user and from which clips may be extracted and to open the base media file.
- Instruction set that directs the processor 110 to receive an input from a user to create a new clip in the preparation list, the new clip being extracted from the opened base media file,
- Instruction set that directs the processor 110 to receive an input from a user to set a first time point in the base media file as the start of a clip in the preparation list and to set a second time point in the base media file as the end of said clip, including to provide the user with the option to set a time point of a clip according to the paused position of the media player, and to obtain the paused position of the media player in response to such a request by the user.
- Instruction set that directs the processor 110 to receive an input from a user to play at least one highlighted clip in the preparation list and to play the at least one highlighted clip to the user in a media player.
- Instruction set that directs the processor 110 to receive an input from a user to play the sequence of clips of a scene, to play the sequence to the user in a media player.
- Instruction set that directs the processor 110 to generate an Edit Decision List for a sequence of clips of a scene.
- Instruction set that directs the processor 110 to receive an input from a user to move the a clip in the sequence of clips listed in the scene-clips list, and to move the clip within the sequence.
- Instruction set that directs the processor 110 to receive an input from a user to import one or more media clips identified in a text data file into the preparation list, and to import the one or more media clips into the preparation list, including instructions to receive the user's activation of a timestamp hyperlink in the text data file and to generated a clip therefrom that includes a segment of a base media file identified by the text data file, the segment staring a the time code associated with the timestamp hyperlink and ending at the time code associated with the next timestamp hyperlink in the text data file.
- Additional instruction sets as described in the specification.

MEDIA PLAYER INSTRUCTION SETS

- Instruction sets that directs data processor 110 to present (e.g., play) the digital media file to the user, and to enable the user to rewind, pause, play, and fast-forward through the digital media file; and to track the current playing time of the media file.
- API instruction sets that direct data processor 110 to control the operation of the media player via requests from the wrapper, to perform such tasks as providing the time code of the current playing time and the name of the media file, and of opening a specified media file and setting the playing time of the media file to a specified time code.

COMPUTER READABLE MEDIUM

FIG. 12

Story Board

Created by: Teresis Demo 31.12.2005

| Name: | Sample Story | | | Edit |

Story Board Editor

| | My Story Begins<br>Teresis Team<br>Time 00:46:09:07 | 1 | My story continues...<br>Team<br>Time 00:00:00:00 | 2 | Episode 3<br>Team<br>Time 00:00:00:00 | 3 | Episode 4<br>Team<br>Time 00:00:00:00 |
|---|---|---|---|---|---|---|---|
| 1 | Intro scene<br>Intro<br>Time 00:00:24:07 | | new scene<br>New<br>Time 00:00:00:00 | | Time 00:00:00:00 | | Time 00:00:00:00 |
| 2 | Main scene<br>Main<br>Main scene<br>Additional<br>Time 00:38:34:28 | | Time 00:00:00:00 | | Time 00:00:00:00 | | Time 00:00:00:00 |
| 3 | Final scene<br>The end<br>Time 00:07:10:02 | | Time 00:00:00:00 | | Time 00:00:00:00 | | Time 00:00:00:00 |
| 4 | Time 00:00:00:00 | | Time 00:00:00:00 | | Time 00:00:00:00 | | Time 00:00:00:00 |
| 5 | Time 00:00:00:00 | | Time 00:00:00:00 | | Time 00:00:00:00 | | Time 00:00:00:00 |

*FIG. 14*

Story Board

Created by: Teresis Demo 01.12.2005

Name: | Sample Story |

Story Board Editor

| | My Story Begins ⊠<br>Teres-Team<br>Time 00:46:09:07 | 1 | My story continues ⊠<br>Team<br>Time 00:00:00:00 | 2 | Episode 3<br>Team<br>Time 00:00:00:00 | | Episode 4 ⊠<br>Team<br>Time 00:00:00:00 | 3 |
|---|---|---|---|---|---|---|---|---|
| 1 ⊠ | Intro scene [E]<br>Intro ⊠<br>Time 00:00:24:07 ⊞ ⊠ | | new scene [E]<br>New ⊠<br>Time 00:00:00:00 ⊞ ⊠ | | Time 00:00:00:00 ⊞ | | Time 00:00:00:00 ⊞ | |
| 2 ⊠ | Main scene [E]<br>Main ⊠<br>Time 00:00:00:00 | | Time 00:00:00:00 ⊞ | | Time 00:00:00:00 ⊞ | | Time 00:00:00:00 ⊞ | |
| | Main scene [E]<br>Additional ⊠<br>Time 00:38:34:28 ⊞ ⊠ | | | | | | | |
| 3 | Final scene [E] | | Time 00:00:00:00 ⊞ | | Time 00:00:00:00 ⊞ | | Time 00:00:00:00 ⊞ | |

[ Add Episode ] [ Add Act ] [ Save ]

FIG. 15

STORYBOARD EDITOR WRAPPER INSTRUCTION SETS

- Instruction set that directs data processor 110 to define the screens displayed to the user, including the view screen and edit screen, of the Storybook Editor, to start an instance of the media player if needed, and to configure communication protocols between the wrapper and the instance, including routing of user input and event handling.
- Instruction set that directs data processor 110 to open a selected storybook file for viewing and for editing.
- Instruction set that directs the processor 110 to present to a user an edit screen for a storybook, the edit screen comprising a table having a set of rows and a set of columns, one of the sets of rows or columns representing the episodes for a storybook, and other of the sets representing the acts of the episodes, with each episode capable of having one or more acts, each act being located in a cell of the table.
- Instruction set that directs the processor 110 to receive input from the user to associate a scene file with an act, and in response thereto to associate the scene file with the act.
- Instruction set that directs the processor 110 to receive input from the user to add an episode to the storyboard, and in response thereto to add an episode to the table.
- Instruction set that directs the processor 110 to receive input from the user to add a blank act to each episode of storyboard, and in response thereto to add a table cell to the table for a blank act for each episode of the storybook.
- Instruction set that directs the processor 110 to compute the playing time of each act that has at least one scene from the data files of the scenes associated with each act, and to display the computed playing times in the tables cells for the acts.
- Instruction set that directs the processor 110 to present a list of storybooks to a user, the instruction set include instructions to access a file system for the data files of the storybooks.
- Instruction set that directs the processor 110 to receive an input from the user to edit a scene indicated in a cell of the table, an to invoke an instance of a scene editor to enable the user to edit the scene.
- Additional instruction sets as described in the specification.

COMPUTER READABLE MEDIUM

*FIG. 17*

MULTIPURPOSE MEDIA PLAYERS

CROSS-REFERENCE TO RELATED APPLICATIONS

This application is a continuation of U.S. application Ser. No. 15/849,349 filed Dec. 20, 2017, which, in turn, is a continuation of U.S. application Ser. No. 14/054,242 filed Oct. 15, 2013, issued on Jan. 9, 2018 as U.S. Pat. No. 9,864,478, which, in turn, is a continuation of U.S. application Ser. No. 13/525,171 filed Jun. 15, 2012, issued on Nov. 5, 2013 as U.S. Pat. No. 8,577,683, which, in turn, is a continuation of U.S. application Ser. No. 11/816,090 filed Aug. 15, 2008, issued on Jun. 19, 2012 as U.S. Pat. No. 8,204,750, which, in turn, is a National Phase Application of International Application No. PCT/US2006/005300 filed Feb. 14, 2006, published as WO 2006/088941, which, in turn, claims the benefit of U.S. Provisional Application No. 60/653,057 filed Feb. 14, 2005.

TECHNICAL FIELD

Aspects of the present invention relate to video editing processes and systems.

BACKGROUND

The entertainment industry has developed a new genre of movie/television entertainment called "Reality TV," or "unscripted programming." In this genre, untrained actors are placed in various settings with general direction and rules to guide their interactions, but without a specific script for actions or dialog. Beforehand, the production staff has a general idea of the storyline for the production, but the final storyline will depend upon the interactions that take place. Several video cameras are located within the settings and record the interactions among the actors for long periods of time. Various stimuli may be introduced into the settings by the production staff to provoke unpredictable interactions among the actors. After several settings have been videotaped for several hours over several days by several cameras, the production staff reviews hundreds to thousands of hours of videotape and constructs a final storyline for the TV production (i.e., media work).

In a typical production, the raw video material is reviewed by several people, typically in the range of 10 to 50, each doing a specific task, such as logging, transcribing, scanning for story points, story writing, and setting creative directions. To review raw video material, each of the hundreds of videotapes is duplicated several times, and the duplicates are distributed among the production staff. Transcribers then create transcripts of the tapes, and loggers create files that describe the actors and actions present in each tape. The transcripts and logs are then reviewed by storywriters, producers, and directors to identify video tapes to review and to develop storylines for the TV production. The large volume of video material, however, has made it difficult for the production staff to communicate with one another and correctly identify important video scenes. This impedes the creativity and productivity of the producers and the storywriters. In addition, the task of navigating between the transcripts, logs, and video tapes for a user is difficult and time-consuming. Because of this difficulty, and because of the need to have physical access to the duplicate tapes, the production staff is essentially forced to work out of a central facility.

The above problems have hindered the production and development of unscripted programming. A solution to these problems is needed to ease the production of unscripted programming and to enable the genre to expand in new creative directions.

SUMMARY

In a first illustrative embodiment, a computer readable medium containing a set of instructions that causes a computer to perform a process comprised of receiving one or more media files. The one or more media files having one or more scenes and each scene including a starting time point and ending time point. The set of instructions may include changing the starting time point and/or the ending time point of a scene from the one or more scenes in response to an input command. The set of instructions may create a new scene and save the new scene based on the new starting time point and/or ending time point of the scene.

In a second illustrative embodiment, a computer system including a computer having memory containing a set of instructions that causes a computer to perform a process of receiving one or more media files. The one or more media files include one or more scenes, were each scene has a starting and ending time point. The computer system may transmit the one or more scenes to an output having an interface to receive an input command. The computer system may change the starting time point and/or the ending time point of a scene from the one or more scenes in response to the input command. The computer system may create a new scene and save the new scene based on the changed starting time point and/or ending time point.

In a third illustrative embodiment, a computer-implemented method receiving one or more media files in which one file includes one or more scenes. The method may change the starting time point and/or the ending time point of a scene from the one or more scenes in response to an input command. The method may create a new scene and save the new scene based on the input command.

BRIEF DESCRIPTION OF THE DRAWINGS

FIG. 3 illustrates an exemplary text data file according to an invention of the present application.

FIG. 5 illustrates exemplary instruction sets embodied on a computer readable memory as a computer program product according to an invention of the present application.

FIG. 6 is an exemplary main page of a scene editor according to an invention of the present application.

FIG. 8 is an exemplary Edit Decision List generated by a scene editor according to an invention of the present application.

FIG. 12 illustrates exemplary instruction sets embodied on a computer readable memory as a computer program product for an exemplary scene editor according to an invention of the present application.

FIG. 14 is an exemplary view screen of a storybook editor according to an invention of the present application.

FIG. 15 is an exemplary edit screen of a storybook editor according to an invention of the present application.

FIG. 17 illustrates exemplary instruction sets embodied on a computer readable memory as a computer program product for an exemplary storybook editor according to an invention of the present application.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
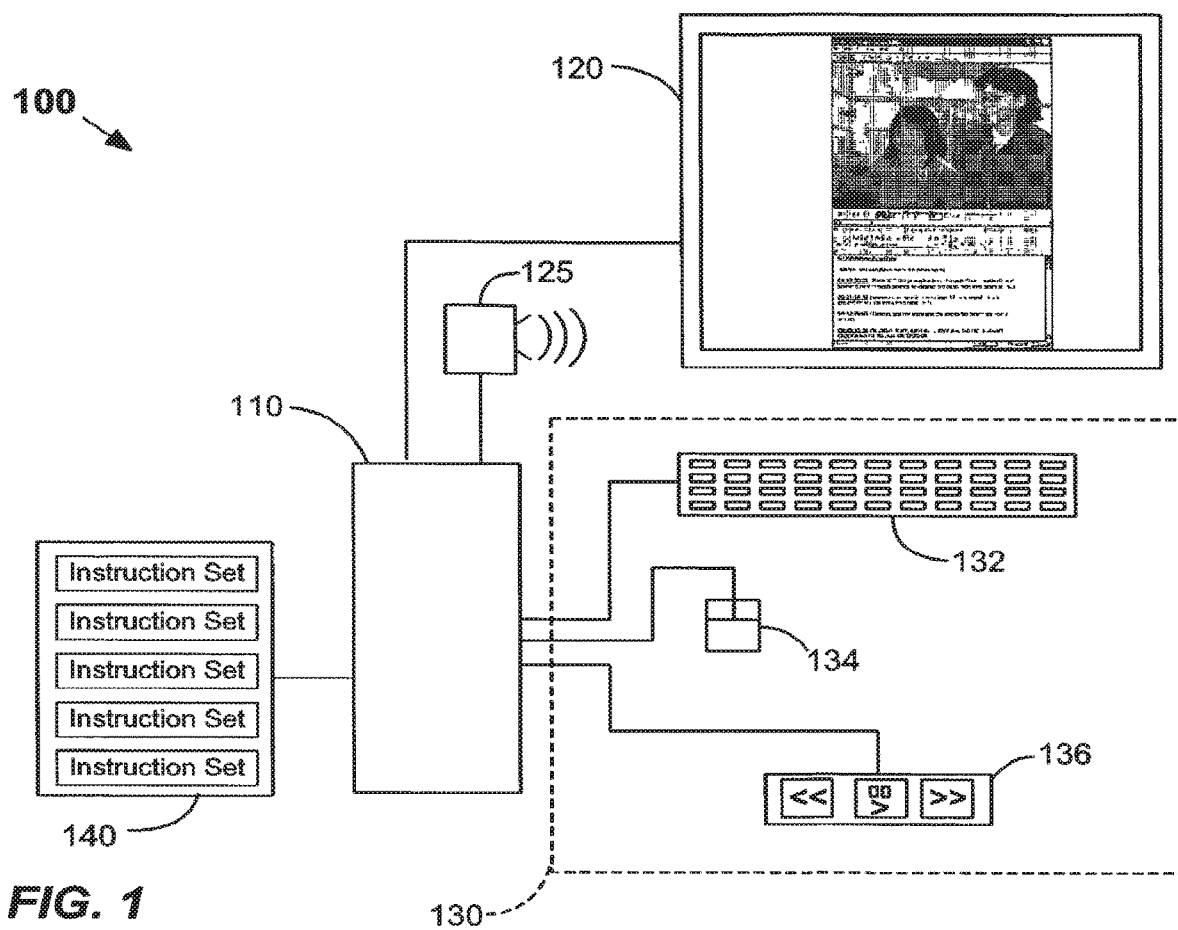
FIG. 1 illustrates a first exemplary multipurpose media player according to an invention of the present application.

An exemplary multipurpose media player 100 according to the present inventions is shown in FIG. 1 and comprises a data processor 110, a display 120 coupled to data processor 110 to provide visual output to the system user, an audio output device 125 coupled to the data processor, a user interface 130 to receive input text and commands from a human user, and a plurality of instruction sets embodied on a computer-readable medium 140 (e.g., memory, disc storage, etc.) that direct the processor to conduct various operations, as described below in greater detail. User interface 130 includes a keyboard 132, and preferably a pointer-control device 134, such as a mouse. The pointer-control device sends signals to data processor 110 to control the motion of a pointer on display 120. In addition, the user interface may include a foot-pedal control device 136 having two or three pedals for controlling the play direction of the media (e.g., rewind, play, pause, and fast-forward).

Figure 2:
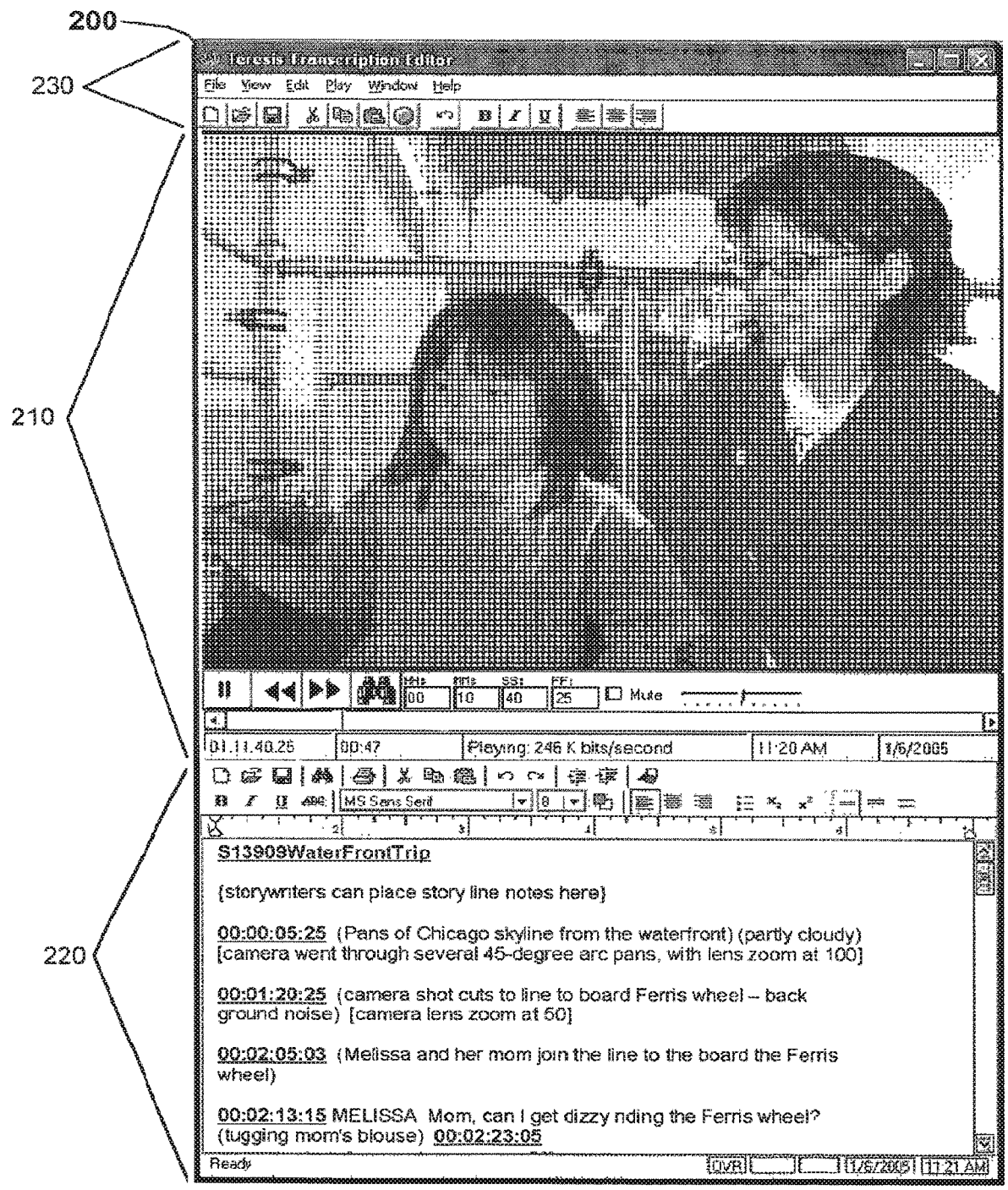
FIG. 2 shows an exemplary set of display screens according to an invention of the present application.

Multipurpose media player 100 enables a human user to play a media stream in a first display area 210 of a computer screen, and to compose text notes in a data file that is displayed in a second display area 220 of the computer screen. FIG. 2 shows exemplary instances of these display areas, with the first display area 210 disposed directly over the second display area 220. It may be appreciated that the screens can be placed in other orientations with respect to one another, such as side-by-side. The media stream may comprise an audio stream, a video stream, or a combination of audio and video streams (preferably synchronized in time). The latter is shown in FIG. 2.

In display area 210, a media player is provided that enables a user to play, pause, rewind, and fast-forward through a media file with conventional play/pause, rewind, and fast-forward buttons arranged along the bottom of area 210 (the play and pause functions are provided as a toggle on one button). These buttons correspond in function to the rewind, play/pause, and fast-forward pedals on foot-pedal control device 136. The media player also preferably provides a search button at the bottom of area 210 (the button with the binoculars) to set the media player to a selected time point, as specified by hours in the adjacent "HH:" box, minutes in the "MM:" box, seconds in the "SS:" box, and frames in the "FF:" box. These boxes are normally updated with values that indicate the time code of the frame currently being played. When the search button is clicked, playing is paused, and the user is allowed to enter a time code in the boxes. The button may be configured such that a second click then causes the media player to go to the video frame corresponding to the entered time code. In addition, the player provides audio mute and volume controls. Finally, a file open button to open a desired media file is provided in area 230. The media player may be provided by a group of instruction sets disposed on computer-readable medium 140.

In display area 220, a text editor is provided to enable the user of multipurpose media player 100 to compose text notes in a data file. Standard file handling buttons (open, save) and formatting buttons are provided along the top of area 220. As discussed in greater detail below with reference to exemplary embodiments, the opening and closing of media files and text data files may be coordinated so that the text data file being edited correlates to the media file being played. In such cases, the file handling buttons in areas 220 and 230 may be coordinated by the same set of instructions.

The text notes entered by the user may comprise one or more of the following items: transcribed dialog; a logging of activities, locations and characteristics of one or more scenes in the audio/video stream(s); production notes; storyline notes; other information. Selected character patterns may be used to distinguish one or more of these classes of items. FIG. 3 shows a portion of an exemplary text data file with text notes. As an example, and as illustrated in FIG. 3, transcribed dialog may appear as normal text, the name of the actor speaking the transcribed dialog may appear in uppercase letters preceding the transcribed dialog, logging information (such as actions and weather conditions) may appear between round brackets "(" and ")", production notes may appear between square brackets "[" and "]" or in all capital letters, and storyline notes may appear between braces "{" and "}". In addition, different colors and fonts may be used. The data file may comprise the rich text format, or a variant thereof.

Multipurpose media player 100 further enables a user to insert time stamps into the text data file, with the time stamps having hyperlinks to the media stream. Upon clicking on a time-stamp hyperlink, the processor repositions the playing of the media stream to play starting from the time point indicated by the hyperlink. The user is able to insert time stamps into the text data file at will. For example, the user may insert a time stamp and a corresponding hyperlink at: (1) the beginning of a scene, (2) a change of a condition in a scene (location, lighting, weather, etc.), (3) the start of each transcribed sentence of dialog, (4) the end of each transcribed sentence of dialog, (5) various points in a storyline, etc. Each time stamp and hyperlink preferably comprises a format based on the SMPTE time code format. The SMPTE time code typically has the following formats: HH:MM:SS.FF or HH:MM:SS:FF, where HH is the hour of the playing time, MM is the minute of hour HH, SS is the second of minute MM, and FF is the frame number of second SS. A time-stamp appearing in a text data file preferably has one of these two forms, and a hyperlink preferably includes the four data fields of the time code (HH, MM, SS, and FF).

Each time stamp and corresponding hyperlink inserted into the text data file is to be referenced to the particular medium that is being played. To establish this reference, a media identifier may be included in the data file as human readable text at a specific location, or delimited by special characters or formatting, or may be included in machine readable form embedded in the data file as metadata. Both are shown in combined form in the example of FIG. 3. When a user clicks on a time-stamp hyperlink, the processor can use the media identifier to load the media into the playing window, if it is not already loaded there. This type of referencing is called "relative referencing" because the time-stamp hyperlink does not specifically identify the media to which it refers, and is interpreted with reference to the media identifier stored in the data file. As another approach, the reference may also be established by embedding the media identifier into each time-stamp hyperlink. For example, the hyperlink may comprise the network address of the media to which it refers and the SMPTE time code. (The network addressing system also includes files stored on the local file system.) This enables a single file to contain references to the SMPTE time codes of two or more separate digital media files. This feature is useful to story-writers, editors, and producers in that it enables each to construct a storyboard for a work in a single file that can reference and play scenes from several different sources. The type of referencing is called "absolute referencing" because the time-stamp hyperlink contains the identity of the media to which it refers. Both relative and absolute referencing may be used in a data file. For example, each time-stamp hyperlink that does not contain a media identifier may be interpreted by the data processor as being referenced to a common media identifier stored elsewhere in the data file.

As yet another approach, which may be referred to as implicit relative hyperlinking, the filenames of the media file and text data file are coordinated such that each has the same base name but different file extensions (i.e., different file types), and such that each is placed in the same directory, or separate but a priori known directories. For example, the text data file may be named "BaseName.rtf" and the media file may be named "BaseName.mpg". A click on a time-stamp hyperlink in a text data file would then be interpreted as a request to play from the media file with the same base name as the text data file at the time code provided by the time-stamp hyperlink. The approach enables the two files to be easily moved to different instances of multipurpose media player 100 (e.g., moved to different computer systems), but it can limit the user to having only one text data file per media file. However, this limitation can be addressed by expanding the filename of the text data file to include additional identifying characters separated by a special character, such as "_". An example of this would be: "BaseName_IdentifyingCharacters.rtf" for the text data file, which would be correlated with the media file "BaseName.mpg", but where the field "Identifying Characters" could be different for several different text data files that had logging/transcription information on the media file "BaseName.mpg".

To facilitate the logging of activities, locations, characteristics, etc. of scenes, preferred embodiments of the present invention provide the user with the ability to create one or more logging classes, and the ability to add members to each logging class. For example, one logging class may contain the names of the actors, with each actor being a member; and another class may contain various location identifiers (e.g., kitchen, living room, hallway, outside, etc.). In addition, these preferred embodiments of the present invention provide the user with the ability to assign a keyboard shortcut to each member so that the member can be entered into the data file with just the entry of the corresponding keystroke or combination of keystrokes. A keyboard shortcut may comprise a function key on a standard computer keyboard (e.g., keys F1 through F12) or may comprise a keystroke combination of two keys, with one of the two keys being the "Ctrl" key or the "Alt" key. As another approach, which may be used in combination with the above, an on-screen menu may be presented for each class, and the user may select a member of a class from a menu using pointer-control device 134 (e.g., a mouse). As yet another approach, a function key may be used to temporarily display a menu of the class members on the screen, and a member may be selected by scrolling to it with the keyboard's up/down keys and then pressing the enter key. These approaches are examples of preselected user input commands. A set of classes, each with their members, may be pre-generated and stored for long-term use. Also, several such sets of classes may be pre-generated and stored. When a media stream is to be transcribed and/or logged, the user can select a desired set of classes to use (e.g., access) by a menu command. In addition, preferred embodiments of the present invention enable the user to define new classes, to add new class members to new and existing classes during the transcription/logging process, and to save the new class sets and modified class sets for reuse.

Figure 4A:
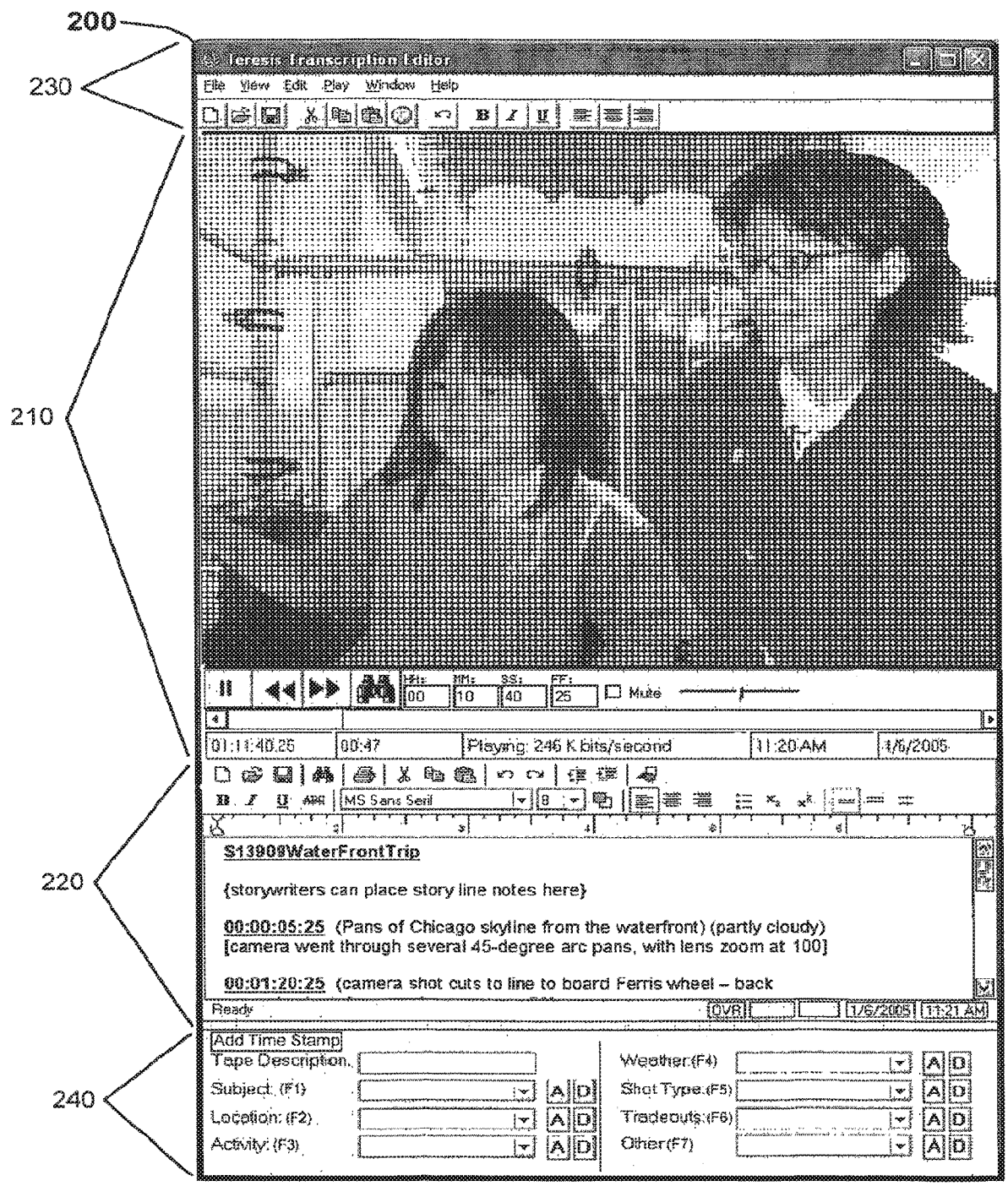
FIGS. 4A-4D illustrate various user-input commands according to an invention of the present application.
Figure 4B:
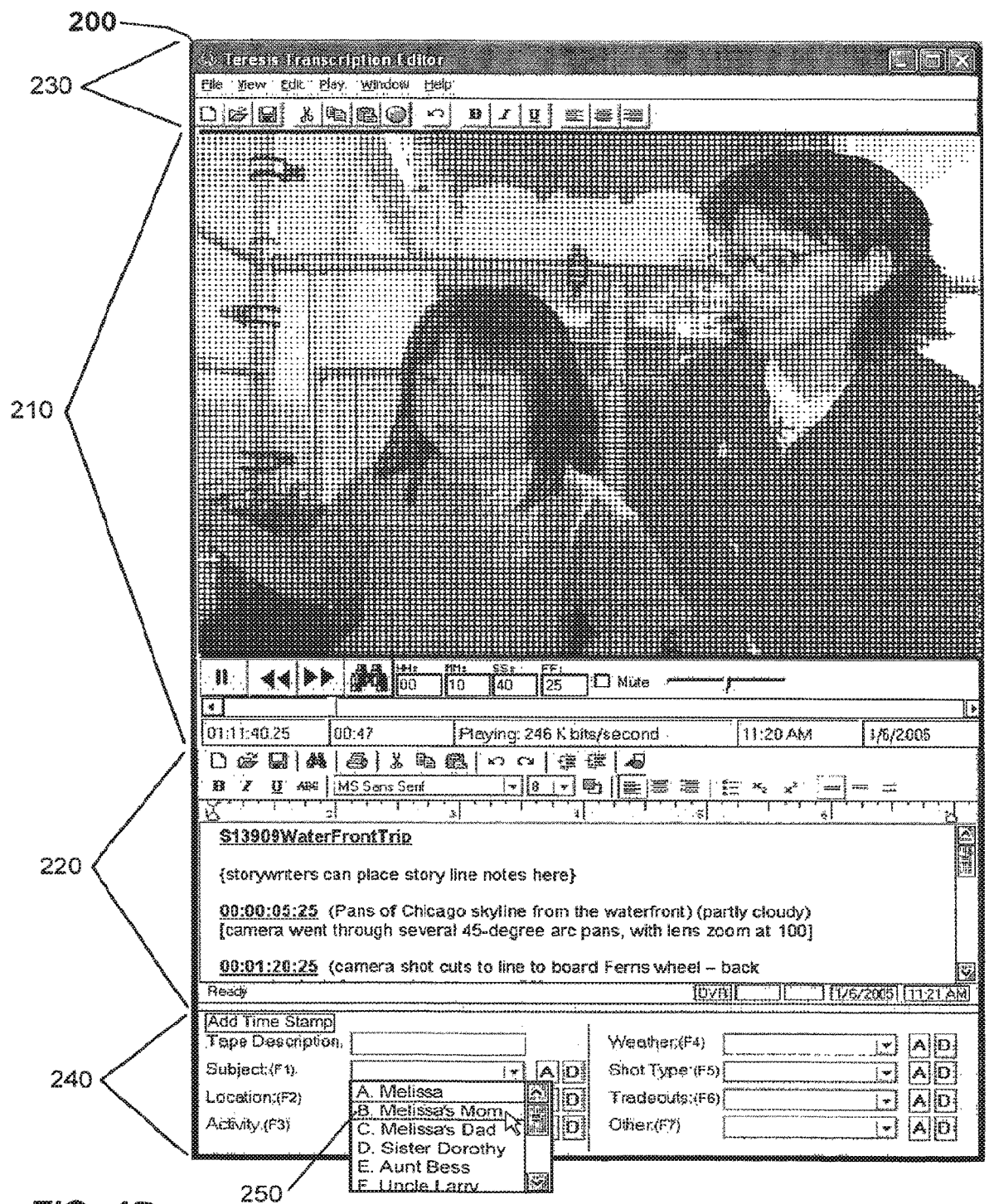
Figure 4C:
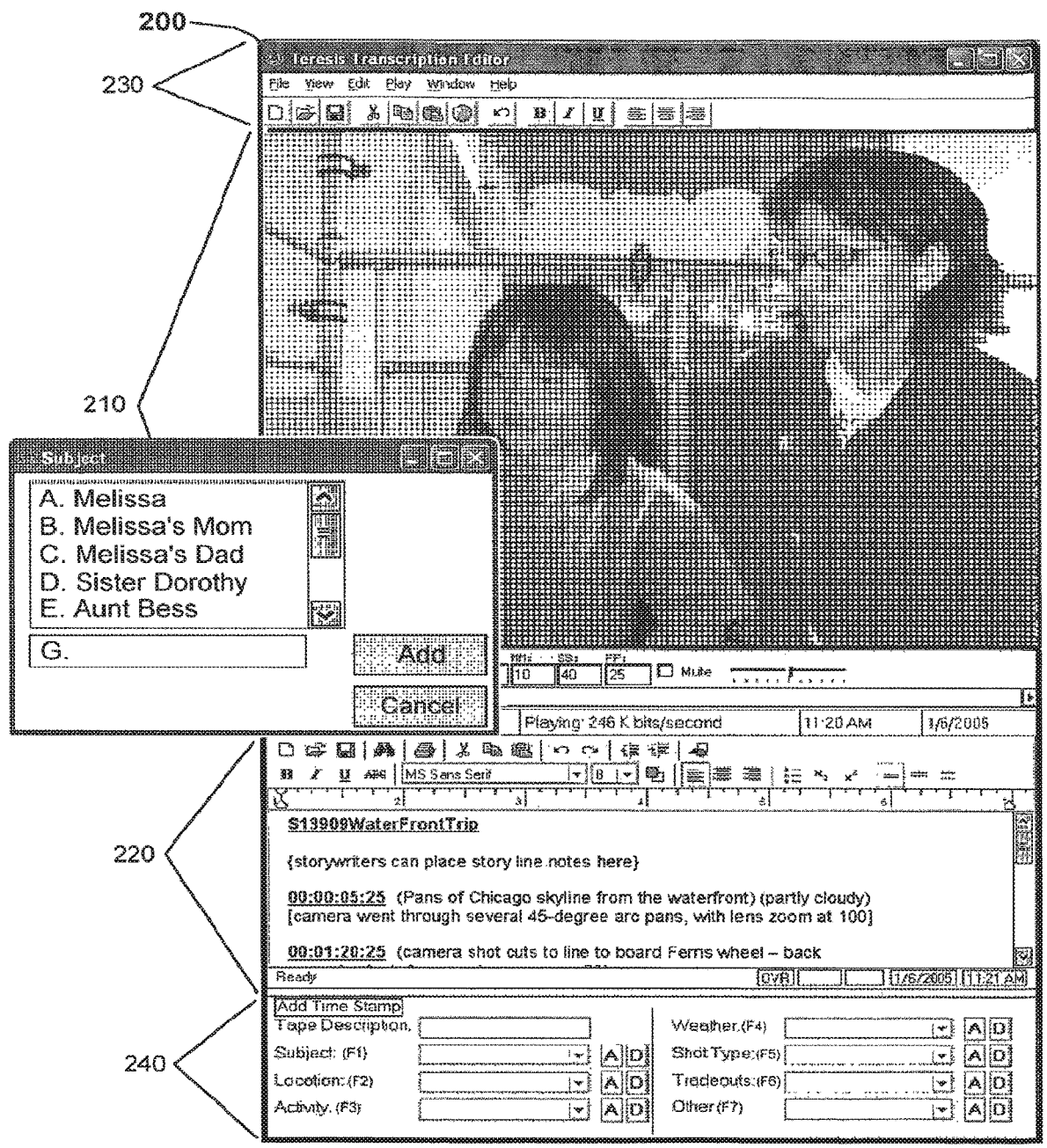
Figure 4D:
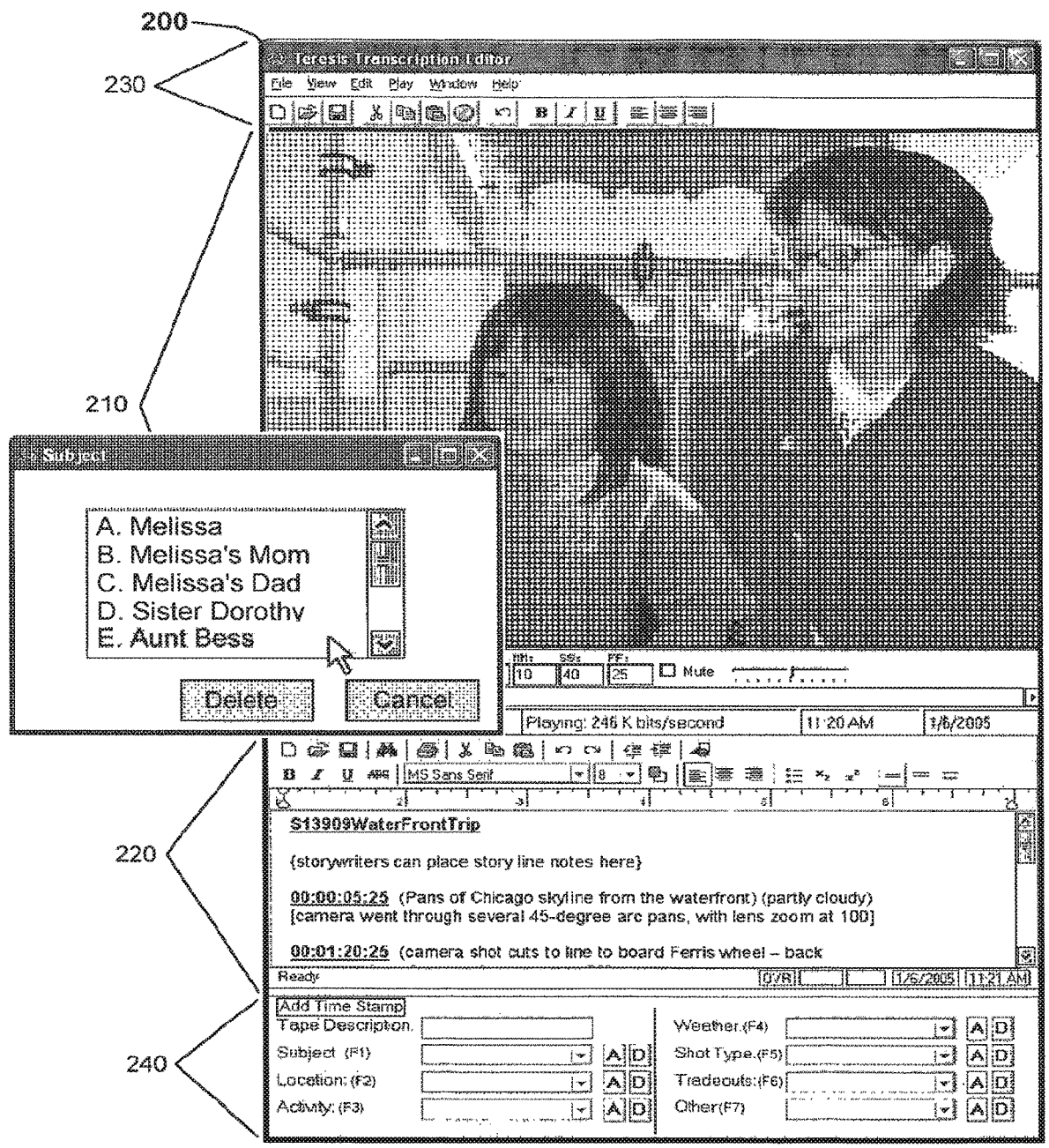

FIG. 4A shows an area 240 having a plurality of menu interfaces for selecting members from the various logging classes, and causing the names of the members to be inserted into the text data file, which is shown in the window in area 220. Area 240 may be brought to the display area by the user typing a preselected hot-key, or by clicking on a submenu under the "View" menu tab in area 230. Seven exemplary classes of logging information are provided: subject (i.e., the actor or person whose dialog is being transcribed), scene location, scene activity, scene weather, shot type, tradeouts, and other (to handle miscellaneous items). Provided for each class are: a drop-down menu (blank text box with down-arrow button), an add button (square button labeled "A"), and a delete button (square button labeled "D"). When the user positions the display pointer over the down-arrow button of a drop-down menu and executes a mouse click, a listing of members appears in a dialog box below the menu, as shown in FIG. 4B. The user may then move the display pointer to a desired member of the class, which causes the member to be highlighted on the screen, and then execute another mouse click to select the member. This causes a text representation of the selected member to be entered in the text data file (shown in area 220) at the cursor location of the editor (the place where new text is being entered into the file). When the user clicks on an add button, another dialog box is brought up, as shown in FIG. 4C. The dialog box provides an empty field for the user to enter the text description of the new member for the class, an "Add" button for the user to click to add a new member using the provided text, and a "Cancel" button for the user to escape out of the addition process. As an option, and as shown in FIG. 4C, the existing members of the class maybe listed to provide confirmation to the user that the appropriate class has been selected, and that the newly-added member is not a duplicate. When the user clicks on a delete button, another dialog box is brought up, as shown in FIG. 4D, which provides a listing of the class members from which to select, a "Delete" button for the user to click to delete a selected member, and a "Cancel" button for the user to escape out of the deletion process. To delete a class member, the user positions the display pointer over the member to be deleted and executes a mouse click to highlight the member, and then clicks on the "Delete" button.

In addition to using the multipurpose media player to create a log and transcription of a medium, a user can use the multipurpose media player according to the present invention to create edit decision lists (EDL files), Avid Log Exchange lists (ALE files), and similar files. Each of these lists is a record of all locations (by time code) of a media file at which selections or other edits are to be produced. The absolute referencing feature enables one to create an EDL or ALE file that refers to several media files.

In order to facilitate the integration of the multipurpose media player with other processes in the production environment, preferred embodiments of the present invention include menu-driven routing and accessing of text data files. As one routing feature, a data file that has been created by a user may be e-mailed to another person by clicking a link in a drop-down menu. The e-mail menu may list specific individuals by e-mail address or name identifier on tabs of the menu, and/or may have a menu tab that opens up a dialog box to select a person in a contact file or receive a typed-in e-mail address. As another routing feature, a data file that has been created by a user may be sent to a network server, storage device, or other network resource by FTP (file transfer protocol). To do this, the user may click on the "File" menu tab in area 230 to select a submenu, which we call the file transfer submenu. This submenu may list specific network servers or addresses on individual tabs of the menu, and/or may have a tab that opens up a dialog box to select a network server or resource. As an accessing feature, the multipurpose media player can communicate directly with one or more database filer servers to read and write thereto various data files, such as media files, log files, transcript files, note files, storyline files, etc. This feature is most readily presented to the user by way of an open file dialog box.

The above features may be implemented by various instruction sets that direct the data processor 110 (FIG. 1) to undertake specific tasks. One general approach of implementing the instruction sets is to divide the instruction sets into two groups. The first group directs data processor 110 in the task of playing the media file in the first display window (FIG. 2) in response to commands from user interface 130, and in the task of responding to requests generated by the second group of instruction sets. The second group of instruction sets direct data processor 110 in the task of displaying the text data file in the second display window (FIG. 2) and modifying the text data file in response to commands from the user interface 130 (thereby enabling the user to edit the file). The second group of instruction sets sends specific requests to the first group of instruction sets, with the latter group providing responses. Such requests may include a request for the filename of the medium currently being played by the first group of instructions, a request for the time code of the current video frame being played, a request for the first group of instructions to set the play time to a specific time-code value, as well as to pause, play, and rewind the playing of the medium, and a request for the first set of instructions to open a specified digital media file for playing. In some embodiments, and as described below in greater detail, part of the second group of instruction sets may be divided out as a third group of instruction sets, with the third group directing the data processor to handle the requests and communications between the tasks directed by the first and second groups of instruction sets.

In conventional operating systems such as Microsoft Windows and Apple's Mac OS, several instruction-set groups may be run by separate parallel processes on data processor 110, with the operating system allocating recurring slices of processing time to each of the processes in a multiplexed manner, and providing communication facilities for the processes to communicate with one another. As such, the tasks performed by each instruction-set group may be performed substantially in parallel with the tasks performed by the other instruction-set groups. In this case, the first, second, and optional third groups of instruction sets may be run by respective parallel processes, with communications between the tasks of these groups being routed through the inter-process communication facilities of the operating system. Conventional operating systems also enable programmers to run several instruction-set groups under one process, but with each instruction-set group being handled by a respective thread of process execution. This enables the programmer to handle the communications between the instruction-set groups within the program's own environment, without relying upon the inter-process communication facilities of the operating system. In this case, the first, second, and optional third groups of instruction sets may be run by respective parallel threads of execution within a single process, with communications between the tasks of these groups being managed by data objects and methods that are global to all of the threads.

The division of the instruction sets into these two or three groups enables one to implement the first instruction-set group with one of several commercially available media players that run on personal computers, such as Microsoft Windows Media Player 10, with the media player being configured by the second or third instruction-set groups for the tasks needed for the embodiments of the present invention. Many commercially available media players, such as Microsoft Windows Media Player, can operate as standalone processes on a personal computer, interfacing with the operating system to receive mouse commands and keystrokes from the keyboard when the media player is selected as the active window. In addition, these media players, including Microsoft Media Player, also include application program interfaces (APIs) that enable a programmer to write a program that starts an instance of the media player running on a respective process or thread, and thereafter controls the operation of the media player by providing commands and inputs to it through the API. In both cases, the media player comprises instructions that direct data processor 110 to present the digital medium to the user via display 120 and audio output device 126. The APIs of the media player provide several command instructions that a programmer can invoke from a number of programming languages (e.g., C++, Java, Visual Basic, etc.). Some of these command instructions enable a programmer to obtain information about the medium that is being played and how it is being played; others enable a programmer to set the parameters and playing state of the player; and still others enable a programmer to configure the appearance of the player, such as rearranging the input buttons and including additional buttons and input fields. To use the media player in this dependent manner, the manufacturer typically provides a dynamic-link library (DLL) which comprises the instruction sets for directing the data processor to implement the media player and the APIs. The programmer creates an instruction-set group having API command instructions (such as through an editing and compilation process), and then assembles the instruction-set group with the DLL of the media player to create a complete application program.

The second group of instruction sets may be implemented as newly-written instructions that implement a conventional text editor plus special-purpose instruction sets that communicate with the media player and control it, and that direct the processor to perform tasks that implement features of the present invention. The computer source codes (i.e., instruction sets) of several public-domain text editors are available for purchase or downloading over the Internet, and can be augmented to incorporate the special-purpose instruction sets of the present invention. The text editor preferably includes instructions that direct data processor 110 to receive keystrokes from the keyboard and store representations of the keystrokes in a text data file, to enter hyperlinks (e.g., file links, html links and variants thereof) into the text data file, to interpret (e.g., handle) hyperlinks in the text data file, and preferably to create and/or save the text data file in rich-text format (RTF), a convention established by Microsoft. As another approach, many commercially-available text editors, such as Microsoft Word, Chado SpellEditor, and Tx Text Control, have DLLs and APIs that enable a programmer to start a dependent instance of the text editor running on a respective process or thread, and thereafter control the operation of the dependent instance of the text editor by providing commands and inputs to it through its API. The API typically enables a programmer to add dialog boxes to the text editor, modify and insert text, add special text and event handling instructions to the editor, and control many aspects of the operation of the text editor by invoking command instructions from one of a number of programming languages (e.g., C++, Visual Basic, etc.). In this approach, the instruction sets of the editor are not changed, but rather a program of special-purpose instruction sets (such as the above-described third group of instruction sets) is created. This program comprises an instruction set that directs data processor 110 to start a dependent instance of the text editor running on a respective process or thread, and to thereafter configure and control it to perform tasks of the present invention using command instructions to the API of the text editor. In this case, a DLL for the text editor is provided by the manufacturer, and this DLL is assembled with the program to create a complete application program.

The special-purpose instruction sets according to the present invention include:

1. An instruction set that directs data processor 110 to coordinate the first and second groups of instruction sets (e.g., media player and text editor) so that the data file currently being edited by tasks directed by the first group of instructions corresponds with the medium being played by tasks directed by the second group of instructions.

2. An instruction set that directs data processor 110 to set up classes (e.g., "Subject," "Location," etc.), and enables a user to edit membership.

3. An instruction set that directs data processor 110 to enable a user to select a member of a class and to insert a text representation of the member in the text data file with one or more keystrokes and/or mouse clicks.

4. An instruction set that directs processor 110 in the following tasks: to detect an input request by a user to insert a time-stamp hyperlink into the text data file; to obtain the time code of a currently-played frame from the media player; and to insert a time-stamp hyperlink in the text data file that bears the received time code and that is located at the cursor position in the text data file. These instructions enable a user to insert a time-stamp hyperlink into the text data file that corresponds to the current playing time of the medium being played.

5. An instruction set that directs processor 110 to recognize the user's activation of a time-stamp hyperlink in the text data file, and to send a command to the media player to cause the media player to set its current playing position to the time code indicated by the activated time-stamp hyperlink. This instruction set enables the user to click on hyperlinks in the text data file to cause the media player to go to specific time points in the medium being played.

6. An instruction set that directs data processor 110 to enable a user to send the text data file to a designated party via e-mail or to upload the data file to an FTP server on a directory. Given the above description of the present invention and the above special-purpose instruction sets, it is within the ordinary skill of a person versed in the software art to construct these instruction sets and to integrate them with media players such as Microsoft's Windows Media Player and Apple's Quicklime, and with text editors such as Chado's SpellEditor, TX Text Control Editor, and Microsoft's Word. The manufacturers of each of the media players and text editors provide software development kits (SDKs) for these components that document the APIs, many of which are readily accessible over the Internet.

As indicated above, a portion of the second instruction-set group can be divided out as a separate third instruction-set group. In this approach, the first instruction-set group provides an instance of a dependent media player (the first instruction-set group may be provided as a DLL, with APIs, of a commercially available media player), and the second instruction-set group provides an instance of a text editor (the second instruction-set group may be provided as a DLL, with APIs, of a commercially available text editor). The third instruction-set group starts the instances of the media player and text editor, coordinates and controls the communications between the user and these instances, handles the communications between the instances, and implements the above-enumerated special-purpose instruction sets. In this approach, the third group of instructions comprises a "wrapper" program composed in Microsoft's Visual Basic or Visual Basic.NET, or as an application program implemented in C++ or C#, or further yet as a script program that is downloaded into a web browser. The latter approach enables the multipurpose media player to be web-browser-based whereby the user need only have a web browser and a media player pre-installed on the user's computer, and where the wrapper and the text editor (such as in the case where TX Text Control is used) are downloaded over the Internet at the time of use by the user, and where the wrapper takes control of the browser window upon being downloaded.

We describe in detail one embodiment where the third group of instructions comprises a wrapper program as its framework. The wrapper comprises several sets of instructions, and may be constructed by a visual basic editor (where the instruction sets are displayed to the programmer at a high level), or a script editor (in the case where the wrapper is constructed to be downloaded into a web browser). The important instruction sets of the wrapper, text editor, and media player are illustrated in FIG. 5, and described in greater detail below. The instruction sets shown in FIG. 5 may be embodied, in all or in part, on a computer readable medium and a computer program product. Referring to FIG. 4A, a first set of instructions sets up a graphical-user-interface (GUI) container 200 that defines a first area 210 in the container where the graphical-user-interface of the media player is placed, a second area 220 in the container where the graphical-user-interface of the text editor is placed, and third and fourth areas 230 and 240 wherein graphical-user-interfaces for the wrapper itself are placed. For web-browser implementations, the container can be set up within a browser window. User inputs provided to the container are routed through the wrapper so that it can detect selected hot-key commands and/or mouse commands (e.g., event detection), and can route each user input to the appropriate component (wrapper, player, or text editor) depending upon which area of the container the user is clicking on or entering text at. For this, the wrapper program comprises an instruction set that directs data processor 110 to define container 200, to start instances of the text editor and media player (typically on separate execution threads), and to configure communication protocols between the wrapper and these instances, including routing of user input and event handling.

The wrapper further comprises an instruction set to direct data processor 110 to receive input from the user as to which text data file or media file to open, and to coordinate the opening of the text data file by the text editor and the corresponding media file by the media player. The latter input can be provided under a menu selection "Open" under the "File" tab in area 230, and can also be provided as a short-cut keystroke (such as "Ctrl-O"). This selection or keystroke brings up a conventional file-system dialog box that lists the files in the current working directory, and allows the user to browse around to other directories and to select another working directory as the current directory. The File System includes files stored on local disk drives attached to the computer running the wrapper, or files stored on file servers accessible by the wrapper over a network or the Internet, or both. The dialog box also permits the user to select a file by highlighting it by mouse click, and then clicking on an "Open" button in the dialog box. Both media files and text data files can be listed in this dialog box, and the user can determine the difference by looking at the file extension or file type indication provided in the dialog box. When the user selects a file to open, the wrapper can use a subset of instructions that direct processor 110 to obtain the file extension or file type of the selected file (by using an API command instruction to the File System), and to determine whether the selected file is a media file or a text data file. If a media file is to be opened, the instruction set directs processor 110 to send a command to the media player to open the requested file. The instruction set also directs processor 110 to locate the corresponding text data file or to create a new text data file if one does not already exist (by using an API command instruction to the File System), and directs the text editor to open the text data file. To coordinate these tasks, both the media file and the corresponding text data file may be kept in the same file directory, and may share the same base filename, but have different file extensions (e.g., ".mpg" for the media file and ".rtf" for the text data file). When the user selects a text data file to open, the instruction set directs processor 110 to determine the name of the corresponding media file, and to send commands to the text editor and the media player to open the requested files. To determine the filename of the corresponding media file, the instructions can direct the processor to extract the base name of the text data file, and then search the directory for a media file with the extracted base name using API command instructions to the File System. As another approach, the contents of the text data file may be augmented upon initial creation to include the name of the media file (such as in the form of human-readable text and/or hidden metadata), and the instructions may direct processor 110 to read the filename of the media file directly from the text data file by using API commands to the file system to open the text data file and to read the file's characters.

The above instructions can be structured as a code segment that is activated upon the event of the user clicking on the "Open" menu of the "File" tab in area 230, and can include API command instructions to the File System (to bring up the open file dialog box, to determine if a corresponding media file or text data file exists in a selected directory, and to create a new text data file when needed), and API commands to the media player and the text editor (to instruct them which files to open). The code segment, as well as any code segment described herein, may be provided in any programming language, including a scripting language. The wrapper preferably also comprises instructions that direct data processor 110 to set up variables (e.g., an object) and to store the filenames of the media file and the text data file in the variables. All of the above instructions can be used to provide the above-enumerated first special-purpose instruction set. It may be appreciated that, in place of the network File System that is made accessible by the operating system, the text data files and the media files can be stored in a database having a set of query and access commands that can be used by the wrapper to access the database in the same way that the wrapper can access the File System.

To provide the user with the logging classes and members shown in GUI area 240, the wrapper has the following further instructions. A subset of instructions is executed upon startup of the wrapper and it provides the presentation of the classes in area 240, along with a drop-down menu for each class, an "add" button ("A") for each class to add members, and a "delete" button ("D") for each class to delete members. This subset can comprise generic codes provided by Visual Basic or the script language that are configured to present the specific input fields and buttons (e.g., generic codes that provide window forms). A subset of instructions is also provided to direct data processor 110 upon startup of the wrapper to read a configuration file that contains a listing of the classes and the members of each class, and to populate the drop-down class menus with the corresponding members. A code segment can then be associated with each "add" button and, when the corresponding button is clicked, it directs processor 110 to present a dialog box to the user where the user may enter the name of a new member for the class. The code segment directs processor 110 to take the name and add it to the drop-down menu and the configuration file. Similarly, a code segment is associated with each "delete" button and, when the corresponding button is clicked, it directs processor 110 to present to the user a dialog box listing the members in the class, and to enable the user to highlight a listed member and thereafter remove it from the class by clicking a delete button on the dialog box. In response to this input, the code segment further directs processor 110 to delete the selected member from the drop-down menu and the configuration file. Similar menus and code segments are included to direct data processor 110 to receive user input on adding and deleting classes from the current group of classes in use, and to modify the internal class objects to reflect the additions and deletions requested by the user. The above instructions can be used to provide the above-enumerated second special-purpose instruction set (i.e., the instruction set that directs data processor 110 to set up classes and enables a user to edit class membership). The instructions can use API command instructions to the File System to open, read, modify, and close the configuration files as needed. Typically, the classes are stored as data objects of the wrapper (which are forms of variables), each object containing a listing of the class membership. The objects are initialized with the data from the configuration file upon startup, and are modified by the user's inputs according to activation of the add and delete buttons. Upon exiting the program, the configuration file may be opened and then modified according to the state of the data objects, or rewritten anew according to the state of the data objects. A command to exit the program may be provided by way of a menu selection "Exit" under the "File" tab in area 230, and by the "x" button at the top right corner of the container. A code segment is associated with each of these inputs, and the code segment may include instructions to update the configuration file with the current state of the class objects.

In addition, the wrapper may include further instructions to enable the user to select a configuration file to use to populate the classes. A menu selection "Open Class Configuration" may be provided under the "File" tab in area 230 to allow the user to do this. Clicking on this menu selection executes a code segment of instructions that direct processor 110 to do the following tasks; (1) present a file-selection dialog box to the user to select a configuration file, (2) open the selected file and read the contents with API command instructions to the File System, (3) refresh the objects holding the class membership with the data read from the selected configuration file, and (4) close the selected configuration file.

During the transcription and logging phase, the user is normally typing dialog and other information into the text-editor display in area 220. The inputs to the wrapper are being routed to the text editor or the media player, depending upon which component (e.g., text editor or media player) was last selected by the user. When the user wishes to insert a member of a class into the text data file, the user may click on a pull-down menu in the wrapper's GUI area 240 (at the down arrow), and then move the display pointer to the member to be selected, as shown in FIG. 4B at 250. The user executes a second mouse click to make the selection. Upon the selection, the wrapper's instructions direct data processor 110 to generate a text string representative of the selected class member, and executes an API command instruction to the text editor to direct data processor 110 (under the processing thread for the text editor) to insert the contents of the text string at the current location of the text editor's cursor. The text string may include character patterns, such as uppercase letters and the use of brackets and braces as described above, depending upon the class. The selection of a class member may also be made by hot-key. For example, each of the classes can be assigned a function key (such as F1 for Subject, F2 for location, as indicated in FIG. 4B), and each member in a class may be assigned a letter (such as "A" for Melissa, "B" for Melissa's Mom, etc., as indicated in FIG. B). To insert "MELISSA" as a subject, the user could hit the "F1" key and the "A" key in sequential order. As an aid to the user, and as an option, when a function key is hit, processor 110 can be directed to present a display box or dialog box to the user showing the members of the class corresponding to the function key, with each member presented along with its corresponding letter. To accomplish this, the wrapper can comprise instructions that direct processor 110 to detect the pressing of a function key (event detection), to thereafter display the members of the corresponding class on the screen, to detect the next letter (or the escape key to escape out of the selection), and to correlate the typed letter to the corresponding member. With the selection made, processor 110 may then be directed by the instructions to generate a text string representative of the selected class member along with any corresponding character patterning for the class, and to insert the contents of the text string at the current location of the text editor's cursor, as described above.

The above instructions can thereby be used to provide the above-enumerated third special-purpose instruction set that directs data processor 110 to enable a user to select a member of a class and to insert a text representation of the member in the data file with one or more keystrokes and/or mouse clicks. Hot-keys, keystroke combinations, selection of menu options and input into dialog boxes are all forms of user input commands.

During the transcription/logging process, the user can hit a selected hot-key (such as Ctrl-T), or make a mouse click on a specially designated button ("Add Time Stamp" shown in area 240 of FIG. 4A), to enter a time-stamp hyperlink into the text data file that corresponds to the current playing time of the medium being played. The wrapper may comprise an instruction set that directs data processor 110 to detect the selected hot-key and/or mouse click (such as by event detection), to thereafter obtain the time code of the currently-played frame from the media player (which may be done by an API command instruction to the media player), and to cause the text editor to insert a hyperlink at its current cursor position that has the obtained time code. The last step may comprise the steps of inserting a text string of the time stamp (e.g., "HH:MM:SS:FF") at the current cursor position by having the wrapper issue an API text-insert command to the text editor, selecting the inserted text by having the wrapper issue an API text select command to the text editor, and converting the selected text to a hyperlink by having the wrapper issue an API link-conversion command to the text editor. The API link-conversion command directs the text editor to convert the selected text into a hyperlink that will generate a link-clicked event in the text editor when the user clicks on the text with the mouse. (The format and handling of the hyperlink is discussed in greater detail below.) Some editors also have API commands that enable hyperlinks to be directly inserted into the file. All of the above-described API commands are typically provided by commercially available text editors, such as Microsoft Word, Chado SpellEditor, and Tx Text Control.

In the Chado SpellEditor, an API command instruction that may be used to select inserted text is "SetSelection(*)", and an API command instruction that may be used to convert selected text into a hyperlink is "SelectionIntoLink(*)". When a user clicks on a hyperlink created in this manner, SpellEditor calls the function "LinkClicked" to handle the input event. In the current version of SpellEditor, the SelectionIntoLink(*) command is only effective during the editing process, and the hyperlinks created during this time are lost when the file is saved. To remedy this, the wrapper may include additional instructions to scan through a text data file to detect instances of the time codes, and to convert each detected instance to a hyperlink with a call to SelectionIntoLink(*). These instructions can be included in the wrapper's instructions that handle the opening of the text data files. Other text editors, such as Tx Text Control, allow hyperlinks to be inserted in HTML formal into the text file by an API command instruction, which allows a greater flexibility in inserting the hyperlink and in executing it when it is clicked. After first describing some relatively simple hyperlink embodiments, more preferred hyperlink embodiments are described.

Input events, such as the link-clicked event, are part of the well-known input-handling framework for object-oriented software. In this framework, processor 110 runs various tasks that are related to one another in a parent-child manner. For example, the operating system is a central parent task to all other tasks, and the wrapper is a child task of the operating system. In turn, the instances of the media player and the text editor are child tasks to the wrapper. In the input-handling framework, the programmer assigns various input events to the child task for it to detect, and provides handling instructions for each of the assigned input events. Input events include single mouse clicks on menu tabs and buttons, double mouse clicks on menu tabs and buttons, keystrokes, hot-keys, link-clicked, etc. The handling instructions for an assigned input event may direct the child task to use the detected input event for its own purposes, or may direct the child process to pass the detected input to its parent task or to the operating system (e.g., Windows event handler) for use. If the child task has children tasks of its own (such as the wrapper), the handling instructions for an assigned input event may direct the child task to pass the detected input event to one of its child tasks. As a default, unassigned events may be passed to the task's parent. In the exemplary embodiment discussed here, the wrapper preferably handles input events occurring in areas 230 and 240 (FIG. 4A) itself, and also handles hot-key events occurring in container 200 (such as insertions of time stamps by use of the Ctrl-T keystroke combination and insertions of class members by use of the function keys). Except for the hot-key events, input events occurring in area 220 are passed to the text editor for handling, and input events occurring in area 210 are passed to the media player for handling. When a link-clicked event occurs in the text editor instance, the text editor instance is configured to pass the event to the wrapper for handling. Most commercially available text editors have API command instructions that enable a calling program (such as the wrapper) to set this configuration.

When a user clicks on a time-stamp hyperlink in the text data file, the text editor detects the link-clicked event and passes the hyperlink information, including the time code, to the wrapper for handling. The wrapper examines the hyperlink to determine if it is a time-stamp hyperlink, or another type of hyperlink. Prior to this, the wrapper coordinated the media player and the text editor to process respective files that are related to the same underlying media asset. Thus, if the wrapper determines that the hyperlink was a time-stamp hyperlink, the wrapper can immediately issue an API command to the media player to set its current playing time to the time code that was given to it by the link-clicked event. If the wrapper determines that the passed hyperlink is of another type, it may ignore it or it may pass the hyperlink to an event handler of the operating system, which can then consult a registry to determine which browser program to start and pass the hyperlink to the browser program, for handling.

In the above example, the wrapper coordinates the media player and the text editor to process respective files that are related to the same underlying media asset. In this case, the hyperlink that is passed between the text editor and the wrapper need only contain the time code since the wrapper already knows which media file the time code refers to. Thus, the filename of the media file need not be included in the hyperlink, and the hyperlink is in the form of an implicit relative link. However, it may be appreciated that the hyperlink may contain the filename of the media file to which the time code refers, and that the filename may be inserted into the text data file along with the time code by one of the API command instructions to the text editor discussed above. This would result in an explicit relative hyperlink. When this hyperlink is clicked on and passed to the wrapper by the text editor, the wrapper may examine the filename to ensure that the media player is playing the same media file as indicated by the filename before directing the media player to set its current playing position to the hyperlink's time code. If the media player is not playing the media file indicated by the filename passed by the hyperlink, the wrapper can include instructions to search the current working directory for the media file, and direct the media player to load the media file before directing the media player to go to the time code indicated by the hyperlink. To facilitate this searching, the hyperlink may include the directory location of the filename in the file system or the network address of the file (if it is accessible over a communications network).

Some text editors have API command instructions that direct the text editor to insert an HTML-formatted text string into the text data file at the current cursor position. When receiving such a command, the text editor interprets the text string according to the HTML syntax, and then generates a corresponding representation of the text string in its internal data structure. Some text editors also have API command instructions that allow a programmer to insert a hyperlink directly into the text data file at the current cursor position, such as in the form of an object. In both of these types of commands, the programmer can typically configure the appearance of the hyperlink to show only the time code on the text editor screen, while hiding the full address of the hyperlink from view. For example, a programmer could use such an API command to effectively insert the following HTML-formatted hyperlink at the current cursor position in the text data file:

<a href="\\fileserver\MediaDirectory\MediaFile.mpg?00:20:13:05"> 00:20:13:05 </a> which would be displayed on the text-editor screen as: 00:20:13:05, and would have the hyperlink address of "\\fileserver\MediaDirectory\MediaFile.mpg", with the time code appended to the hyperlink address as a parameter, and with both the hyperlink address and parameter being hidden from view in area 220. According to the HMTL-language standard, the hyperlink is started with the tag <a>, and ended with the tag <a/>. Text that appears between these two tags will be printed on the screen in hyperlink form (underlined, with the text set optionally set in a different color than non-hyperlink text).

In the above examples of HTML hyperlink timestamps, the filename of the media file and playing position with the medium have been specified by the filename's path within the File System, and a position parameter, respectively. As another and more flexible option, this information may be specified in the hyperlink as a function call, with the filename and playing position provided as arguments to the function (an in turn the program jump). As will become apparent below, this enables the filename and playing position to be encoded or encrypted (preferably encrypted) with a key that may be assigned to a particular user or team of users. This can be used to provide added degrees of security, as discussed below. The function-call form of the hyperlink can take many forms, four examples of which are shown below:

<a href="javascript:jump('position')">HH:MM:SS:FF</a>
<a href="javascript:jump('filename', 'position')">HH:MM:SS:FF</a>

```
<a href="javascript:jump('encrypted_position')">HH:MM:SS:FF</a>
<a     href="javascript:jump('encrypted filename',
'encrypted_position')">HH:MM:SS:FF</a>
``` where
<a href=" "> is the HTML starting tag for the hyperlink, </a> is the ending tag for the hyperlink, "javascript:jump( )" is a function call to a program written in JavaScript, "position" is the playing position in the media file (e.g., the position specified in decimal format where each whole number is one second of playing time), "filename" is the media file's filename in the File System, and where "encrypted_position" and "encrypted_filename" are encrypted or encoded versions of the position and filename, respectively. When the hyperlink is activated, it gets passed to the wrapper, where the jump function resides. If both the filename argument and the position argument have been passed to the wrapper, then the wrapper calls the jump function using a JavaScript engine/execution unit. If only the position argument has been passed, then the wrapper provides the current working file as the filename argument to the jump function, along with the position argument that it received from the handler that passed the hyperlink to it (e.g., the text editor). In turn, the jump program sends commands to the media player to cause it to open the specified file if not already opened, and to jump to the playing position specified by the position argument.

If the filename and position are encrypted, then they are decrypted at an appropriate time during the handling of the hyperlink. For example, the filename and position may be decrypted or decoded by the wrapper using an assigned key before the wrapper passes the arguments to the jump function. The allows all of the hyperlink timestamps to be encrypted or encoded so as to prevent a third party from finding the locations of the media files on the Internet (if the media files are stored in that manner) should the text file having the hyperlink timestamps be intercepted or otherwise found by the third party. As another example, such as when the media files are stored at a central database fileserver accessible over the Internet, the filename may be passed in encrypted or encoded form to the fileserver, which may then transmit the file to the wrapper over a secure channel. In this case, the decryption or decoding of the encrypted filename is done at the central database file server using the assigned key, or an assigned companion key. Currently, the Advanced Encryption Standard (AES) is preferred, but other encryption methods may be used. As another advantage of encrypting the filename, the text file may be viewed using a web browser (under the control of the wrapper) instead of a text editor, and the encryption provides additional security for this mode of operation.

For HTML hyperlink timestamps, it is advantageous to prevent the user from being able to edit the hyperlink. Many HTML-base text editors have the capability to prevent editing of specific portions of an HTML file using the Span tags and an attribute that turns off editing. For example, the TxText Control editor has the attribute contentEditable, which enables the editor to change HTML text when con- tentEditable is set to a true value, and which prevents the editor from changing HTML text when it is set to a false value. Thus, to prevent an HTML hyperlink timestamp from being edited by the user, the wrapper may insert the follow- ing HTML tag before the HTML text for the hyperlink: <span contentEditable=false>, and the following HTML tag afterwards: </span>.

If the text editor can be configured by API command instructions to pass the handling of a link-clicked event on a hyperlink to the wrapper, the wrapper will receive both the filename and directory location of the media file, as well as the time code. The wrapper may then confirm that the media player is playing the media file indicated in the hyperlink before instructing the player to seek the frame corresponding to the time code specified in the hyperlink. If the media player is not playing the media file indicated in the hyper- link, the wrapper may then issue API commands directing the media player to close the existing media file and to open the media file indicated by the hyperlink (e.g., \\fileserver\MediaDirectory\MediaFile.mpg), and thereafter seek the frame corresponding to the time code that is provided as a parameter. This type of hyperlink is an absolute hyperlink, and it enables a single text data file to contain logging and transcription from two or more media files, which can be useful in constructing storyboard docu- ments from multiple media files. The ability to include logging and transcription from multiple media files can also be achieved using hyperlinks that only provide a filename and a time code, such as:

```
<a href="MediaFile1.mpg?00:20:13:05"> 00:20:13:05 </a>
<a href="MediaFile2.mpg?01:00:53:24"> 01:00:53:24 </a>
```

In this case, the wrapper can comprise instructions that direct data processor 110 (as configured by the user or the programmer) to search one or more preselected directories for the media files MediaFile1.mpg and MediaFile2.mpg.

If the text editor cannot be configured by API command instructions to pass the handling of a link-clicked event on the hyperlink to the wrapper, the text editor will generally pass the handling of the link-clicked event to the operating system's event handler. The operating system's event han- dler typically has a registry that assigns the handling of hyperlink types and file types to specific programs, such as Microsoft's Internet Explorer for *.html files and Adobe's Acrobat for *.pdf files. The associations in the registry can be changed by the user through an operating system inter- face, and by a programmer (and a wrapper) through API command instructions to the handler for the registry. In one embodiment, the wrapper can have API command instruc- tions to this handler to change the association for *.mpg files in the registry to indicate that the wrapper is to handle these files. With this change, the operating system's event handler will then pass the handling of the hyperlink to the currently running instance of the wrapper. The wrapper may then receive the hyperlink and process it as previously described. Upon exiting the wrapper program, the wrapper preferably has instructions that will change the association of the media files in the registry back to the initial configuration.

To avoid modifying the registry in the above manner, the following protocol can be used to structure the instruction sets. For each media file, a place-holder file with a unique file extension (such as ".wrp") can be created by the wrapper for each media file handled by the wrapper, and the registry may be modified to associate the handling of these files with the wrapper. Instruction sets in the wrapper, executed during the creation of a text data file, may accomplish these tasks. For example, a place-holder file could be named "MediaFile1.mpg.wrp" for the media file "MediaFile1.mpg." The file may be a zero-byte file, or may contain the filename of the media file. The wrapper may then enter hyperlinks into the text editor in a form that uses the place-holder file, such as

```
<a href="MediaFile1mpg.wrp?00:20:13:05"> 00:20:13:
05</a>
```

When this hyperlink is passed to the operating system's event handler, the registry directs the operating system to pass the handling of the hyperlink to the current running instance of the wrapper. When the wrapper receives the request to handle the hyperlink, it contains instructions that extract the filename of the media file from the link (e.g, removing ".wrp" from the name of the place-holder file), and then process the hyperlink as previously described.

Both relative hyperlinks and absolute hyperlinks may be readily incorporated into the same text data file. For example, the hot-key sequence "Ctrl-T" may be used to enter a relative time-stamp hyperlink, and the hot-key sequence "Shift-Ctrl-T" may be used to enter an absolute time-stamp hyperlink. The wrapper may then comprise handling instructions for each of these input events. Also, the wrapper can have a default setting for the insertion of hyperlinks that can be set by the user. The default can be set to relative mode, implicit relative mode, or absolute mode, and once set, all inserted hyperlinks will be according to the default setting, unless explicitly overridden by a specific user input command. In addition, the wrapper may include another set of instructions that converts all time-stamp hyperlinks to absolute time-stamp hyperlinks, or to relative time-stamp hyperlinks, or to implicit relative time-stamp hyperlinks. In order to incorporate time stamps related to another media file, another instance of the wrapper may be started and opened to the text data file for the other file. Text from that file may be copied and pasted into the primary working instance of the wrapper. The time-stamp hyperlinks so copied are preferably in absolute form. As yet another approach, the wrapper may have a set of instructions, activated by a menu selection of the "File" tab in area 230, to open an alternative media file that is not correlated to the text data file. Text and absolute time-stamp hyperlinks may then be inserted into the text data file from the alternative media file.

The wrapper may further comprise a set of instructions that directs data processor 110 to detect a preselected input command from the user interface requesting to send the data file by e-mail, and to present the user with a dialog input box that enables the user to provide or select an e-mail recipient. The instruction set further directs the data processor to e-mail the data file to at least one recipient indicated by the user. In a similar manner, the wrapper may further comprise a set of instructions that directs the data processor to detect a preselected input command from the user interface requesting to send the data file by file-transfer protocol, and to present the user with a dialog input box that enables the user to provide or select a destination for the data file. The instruction set further directs data processor 110 to transfer the data file to the network address of the destination indicated by the user. With this, one can provide a method of enabling a user to receive a digital medium in stream or file form over a communications network, generate a data file with a description of the digital media, and thereafter to send it to a designated location or person over the communications network. The method may further include the sending of the digital media with an indication of the time period (e.g., turn-around time) in which the description is to be generated.

Scene Editor Multipurpose Player. As indicated above, the ability to place timestamp hyperlinks into a text data file enables producers, storywriters, and other production staff to easily create scene sequences and storyboards in text data files, where the scene clips can be played from the text data files by clicking on the timestamp codes for the scenes. Additional related inventions of the present application provide users with a scene editor and a storybook editor that enable a user to formally construct scene sequences and storyboards, which can, then be exported as Edit Decision Lists (EDLs). The Scene Editor enables a user to create, edit, play and delete audio scenes and video scenes (both being generally referred to as scenes) that are stored on a File System (such as a file server, file database, and the like). Each scene is comprised of one or more media clips, each media clip being a portion of a respective base media file that is identified by a starting time point and an ending time point. The scene editor allows a user to directly specify the clip of a base media file as a clip in a scene, and also allows a user to import a clip from a previously-created text data file, which may be a logging file or a transcription file. Occasionally, a clip may also be the entire base media file, in which case the starting time and ending time points of the clip are those of the base media file. In a typical situation, the user opens a new scene or opens a previously created scene, adds new clips to the scene, deletes unwanted clips, and possibly rearranges the playing sequence of the clips in the scene. The storybook editor enables a user to organize the scenes into acts and episodes (an episode comprising one or more acts). An instance of the scene editor may be called from the storybook editor to edit a scene of the storyboard, as selected by the user.

Preferred embodiments of the scene editor and the storybook editor provide a dependent instance of a media player, and can play clips, scenes, acts and episodes (as the case may be) according to requests by a user. Each scene editor and each storyboard editor can be run on the configuration shown for multipurpose player 100 in FIG. 1, but with each having a respective group of instruction sets. In preferred embodiments, each comprises a wrapper of instruction sets, which call a dependent instance of a media player (which may not be needed for some embodiments of the storybook editor). In further preferred embodiments, each wrapper is downloadable into a web browser and is executable by the web browser. Exemplary scene editors according to the present application are described first, followed by a description of the storyboard editor. The tasks of each will be described, where each task or group of tasks can be implemented by a respective set of instructions that direct a data processor (e.g., processor 110) to perform the corresponding task(s). In view of the present description, it will be well within the ability of one of ordinary skill in the computer arts to construct these instruction sets without undue experimentation.

Exemplary scene editors according to the present invention comprise a main viewing page that lists all of the user's scenes, an example of which is shown in FIG. 6. The screen presents a list of scenes available to the user, with each scene entry providing the name given to the scene by the user, the dates on which the scene was created and last modified, and navigation buttons that allows the user to page through the available scenes, and to search the name fields of the available scenes. This part of the scene editor may be implemented by a respective set of instructions that accesses a File System for the user's scene files, navigates through the files, and searches the file names. In preferred embodiments, this part of the scene editor is implemented as a web page that is presented to the user, with the web page being generated by a file server that holds the user's scene files in a File System. This allows the user to log into the system from anywhere in the world, and work.

Figure 7:
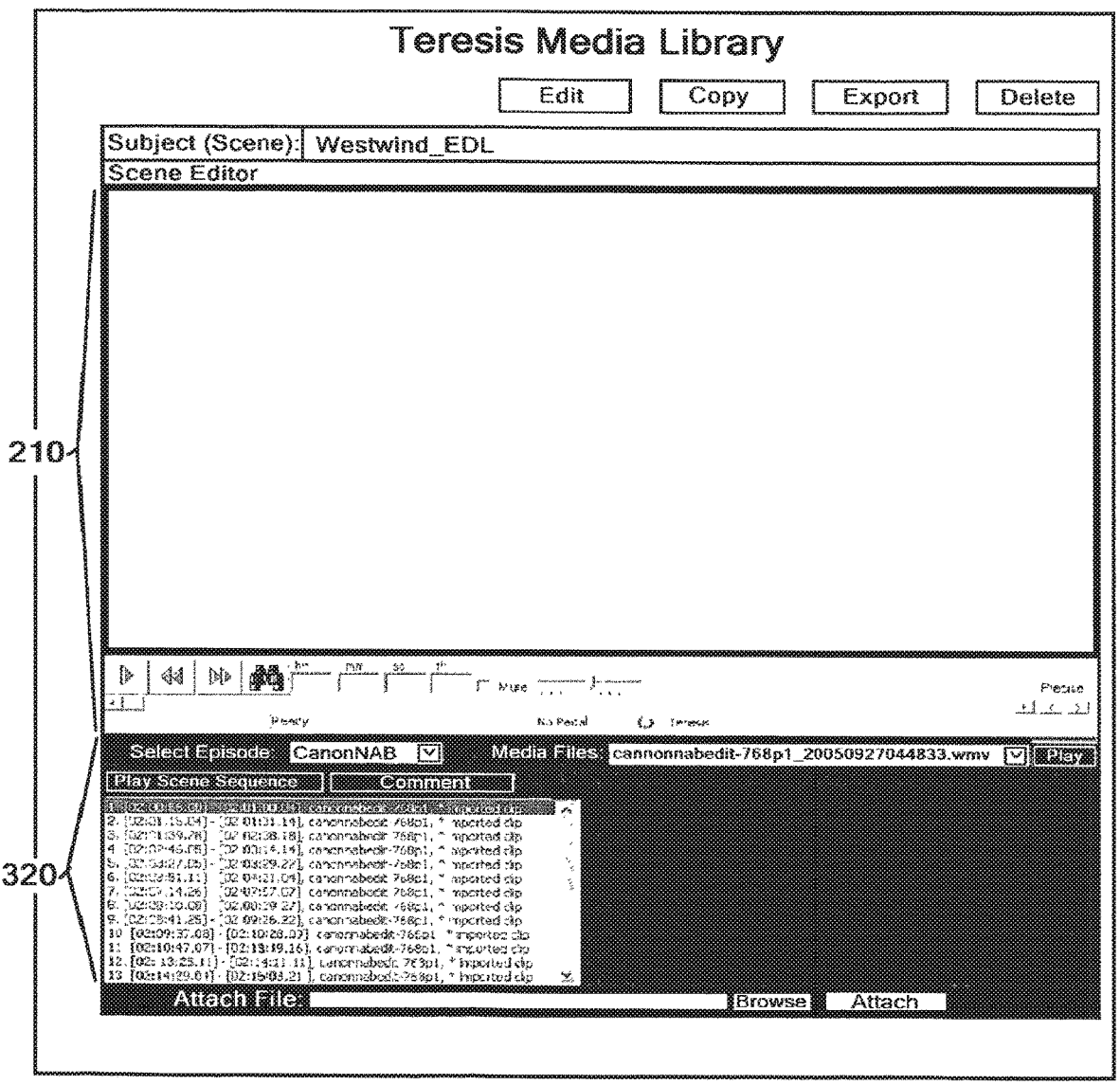
FIG. 7 is an exemplary view screen of a scene editor according to an invention of trio present application.

To view the details of a scene, the user can double-click on the name of the scene in the screen shown in FIG. 6. The scene's name is preferably a hyperlink, which causes a new screen page to load in a browser window with the scene's details in a view screen. An example of this view screen is shown in FIG. 7. It comprises "Edit," "Copy," "Export," and "Delete" task buttons at the top of the screen, and the name of the scene immediately below ("Westwind_EDL" in this example). The view screen further comprises a display area 210 in which the media player is presented, as previously described above, and a display area 320 to show a scene-clips list. Display area 320 comprises a window that displays the clips of the scene, a "Play Scene Sequence" button, and a "Comment" button. For each clip entry, the scene-clips list shows the filename of the base media file from which the clip originated, the starting time point of the clip in the base media file, the ending time point in the base media file, and a user-editable comment field. A clip can be played by the player by double-clicking on its entry in the scene-clips list. Any clip may be highlighted by clicking on it. The "Comment" button enables the user to edit the comment field of a highlighted clip, and the "Play Scene Sequence" button enables the user to have the media player play the scene from start to finish in display area 210. Once the player starts to play the scene sequence, the user may stop the player at any point by clicking a "Quit Scene Playing mode" button, which may appear in the same location as the "Play Scene Sequence" button when the player is playing the scene. Also shown in display area 320 is a "Media Files:" entry box to enable the user to select a base media file, a "Play" button to enable the user to have the media player play the base media file in display area 210, and a "Select Episode:" entry box to enable the user to select an Episode from which to choose a base media file. (In preferred embodiments, the base media files are grouped according to Episodes, which can be thought of as file directories.) Each scene has a data file associated with it that stores the above information about the scene and about its clips, and this file is accessed upon entering the view screen and display, as indicated above.

The part of the scene editor that provides the view screen may be implemented by a respective set of instructions that accesses the File System for the scene's data file, displays the information of the scene in the above manner, enables the user to edit a comment (and to save this information to the scene's data file, to play a highlighted clip in response to a double-click on the highlighted clip, and to play the entire scene sequence in response to the user clicking on the "Play Scene Sequence" button. To play the scene sequence, the instructions can perform the following tasks: loading the information about the clips in the scene's data file into sequentially ordered data structures (e.g., objects), one object per clip, and sequencing through the data structures one after the next, with each sequencing including issuing a play command to the media player to play the base media file indicated in the data structure beginning at the starting time point indicated in the data structure, monitoring the playing position of the media player until the media player reaches the ending time point indicated in the data structure, and then moving to the next data structure in the sequence. In preferred embodiments, this part of the scene editor is implemented as a web page that is presented to the user, with the web page being generated by a file server that holds the scene's data files in a File System. This allows the user to log into the system from anywhere in the world, and work.

Referring to the top of the view screen in FIG. 7, the user may edit the scene by clicking on the "Edit" button, may copy the scene to a new scene by clicking on the "Copy" button, export the file to an Edit-Decision-List (EDL) file by clicking on the "Export" button, or delete the file by clicking on the "Delete" button. Clicking each of these buttons causes the screen editor to execute respective sets of instructions that carry out the above tasks. Of these four, the "Edit" button and the "Export" button are described in greater detail. The copy and delete tasks are straightforward file management tasks that only involve changes to the File System, and do not require any more detail for one of ordinary skill in the art to implement.

Export Mode. Clicking on the "Export" button in the view screen causes a segment of code to be executed that generates an EDL file from the information in the scene's data file. An example of the EDL file is shown in FIG. 8. The EDL file may be provided in a number of formats, including plain text (as shown in FIG. 8), HTML, XML, and MFX. The part of the scene editor that provides the export task may be implemented by a respective set of instructions that accesses the File System for the scene's data file, generates the EDL description in a desired format, saves the format to another file in the File System according to user direction, and displays the generated EDL file in a display window for confirmation by the user, followed by returning to the view screen.

Figure 9:
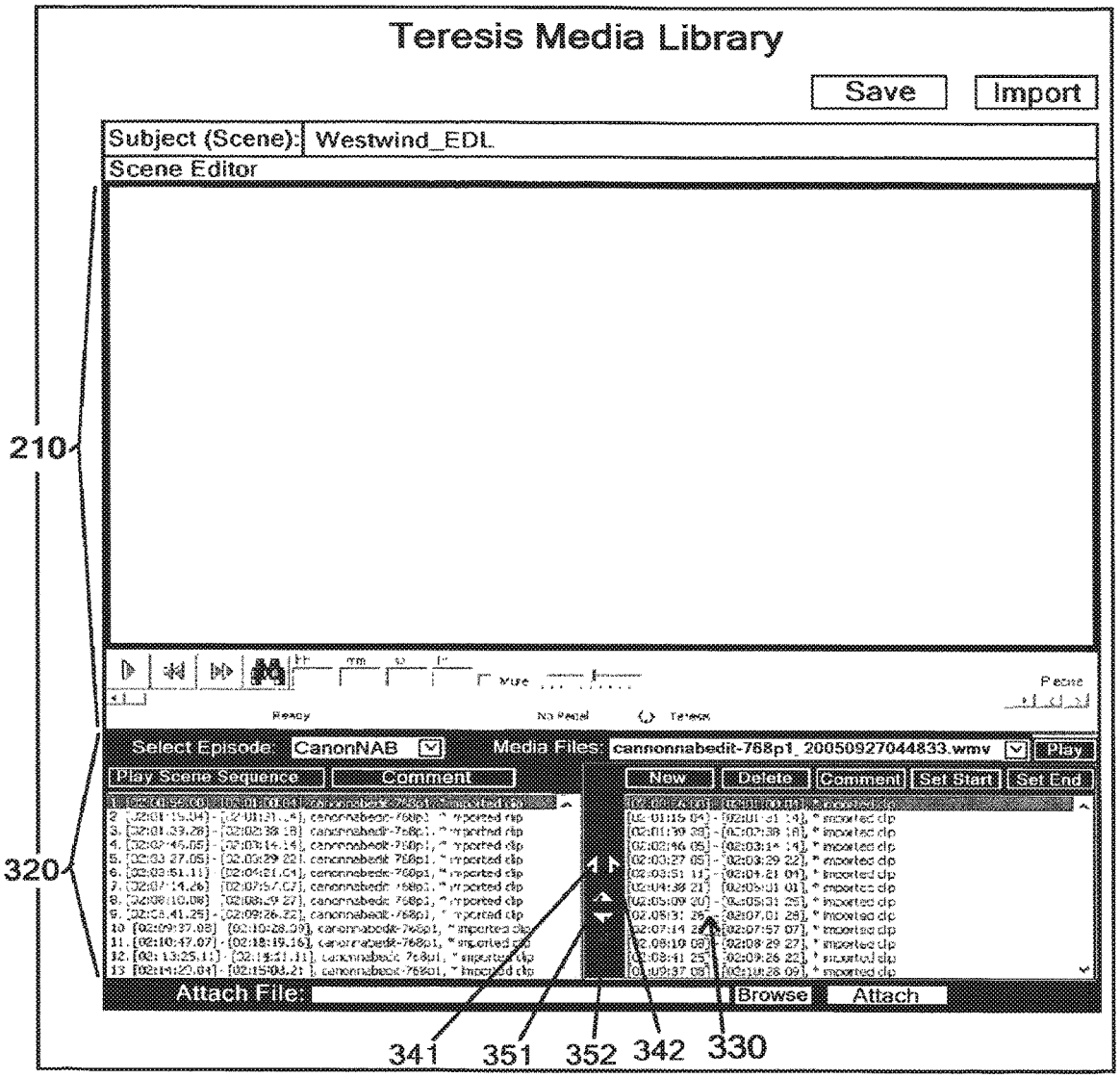
FIG. 9 is an exemplary edit screen of a scene editor according to an invention of the present application.

Edit Mode. Clicking on the "Edit" button in the view screen brings up the edit screen for the scene last viewed in the view screen. The Edit button is preferably a hyperlink, which causes the edit screen to load in a browser window with the scene's details. An example of the edit screen is shown in FIG. 9. It comprises "Save" and "Import" task buttons at the top of the screen, and the name of the scene immediately below ("Westwind_EDL" in this example). The view screen further comprises a display area 210 in which the media player is presented, as previously described above, and a display area 320 to show a scene-clips list, as previously described. It also presents a preparation list in a display area 330 where the user can create new clips from a base media file (as previously described above), and can add the new clips to the opened scene. Clips are initially prepared from base media files in the preparation list, and then transferred to the scene-clips list. The part of the scene editor that provides the edit screen may be implemented with the same instructions to execute common tasks used for the view screen, plus instruction sets that execute the further tasks described below. In preferred embodiments, this part of the scene editor is implemented as a web page that is presented to the user, with the web page being generated by a file server that holds the scene's data files in a File System. This enables the user to log into the system from anywhere in the world, and work.

For each of its clip entries, the preparation list shows (in display area 330) the starting time point, the ending time point, and a user-editable comment field, which the user may use to give the clip a meaningful title or identifier. Associated with the preparation list are: a text dialog box for the user to select a base media file from which to make new clips (which was described above), a "New" button to enter a new clip from the selected base media file as a new entry in the preparation list (with the time points placed in a "not set" state), and a "Delete" button to delete a clip from the preparation list that has been previously highlighted. A user can highlight a clip for deletion or other processing (as described below) by clicking once on its entry in the preparation list. When a new clip is entered into the preparation list with the "New" button, the filename and File-System location (e.g., directory) of the base media file from which the clip is taken are associated with the entry, but are not shown in the preparation list. However, the filename will be shown in the scene-clips list when the clip is transferred (as described below in greater detail). A clip can be played by the player by double-clicking on its entry in the preparation list. The base media file can be loaded into the player and played by clicking on the "Play" button to the right of the dialog box for the base media file (as described above). This part of the scene editor may comprise instruction sets that respond to the user's clicking of New button to create a new clip using the opened base media file, that create data structures for each newly added clip and update the data structure with the filename of the base media file, that display the contents of the data structure of clips of the preparation list in display area 330, that highlight a clip of the preparation list when a user single-clicks on it, that instruct the media player to play the clip in display area 210 when the user double-clicks on the clip's entry, and that delete a highlighted clip in response to the user clicking the "Delete" button. The data structures for the clips in the preparation list are maintained in a sequential order by the data structures themselves (e.g., linked-list structure) or by an index structure (e.g., pointer array). The same data structures may be used to manage the clips presented in the scene-clips list, and are initially filled upon accessing the data file for the scene.

Further associated with the preparation list are: a "Set Start" button to allow the user to set the starting time point of a highlighted clip, a "Set End" button to allow the user to set the ending time point of a highlighted clip, and a "Comment" button to allow the user to provide or edit the text of a comment field for the highlighted clip. The comment field is updated in the same way as described above, and similar instructions may be used. A user may set each time point by first highlighting the clip, then clicking either the "Set Start" button or the "Set End" button, as the case may be, which will bring up a dialog box for the user to enter the hour, minute, second, and frame information for the starting point, or for the user to click a button on the dialog box which copies the current position location of the media player (as shown in display area 210) into the dialog box. Having done this, the user may click a "Save" button on the dialog box, which updates the data structure for the clip to reflect the new time point information, or may click a "Cancel" button to escape out of the process without setting the time point. The media player preferably provides precise step control buttons 280 to enable the user to step forward or backward in the base media file from a paused position beforehand in order to find a desired starting or ending point for the clip, as the case may be. This part of the scene editor may comprise instruction sets that respond to the user's inputs on the buttons and clip entries to open up dialog boxes, receive information by way of the dialog boxes, and update the data structures for the clips in the preparation list. In addition, this part of the scene editor may comprise the previously-described set of instructions that obtains the current playing position of the media player so that the current playing position of the media file may be input as a starting or ending time point.

Clips in the preparation list can be moved (transferred) to the scene-clips list by highlighting the clip's entry in the list, and then clicking the left transfer button 341. Multiple entries can be highlighted and transferred as a group. If a clip is highlighted in the scene-clips list (the receiving list), the clips being transferred from the preparation list will be inserted before (above) the highlighted clip in the scene-clips list. If no clip is highlighted in the scene-clips list (the receiving list), then the clips being transferred from the preparation list will be added to the end of the scene-clips list. Clips in the scene-clips list can be moved (transferred) to the preparation list by highlighting the clip's entry in the list, and then clicking the right transfer button 342. When a clip is transferred, the associated filename and File-System directory of its base media file are transferred as well. This part of the scene editor may comprise instruction sets that respond to the user's inputs on buttons and 341 and 342 and the highlighting of clip entries in both of the lists, and updating the sequential orderings of the data structures for both lists according to the user's inputs, and thereafter updating the display areas 320 and 330 to reflect the results of the transfers.

In edit mode, the Scene Editor also enables the user to move clips around within the scene-clips list to change the playing sequence of the clips. This is done by highlighting the clip that is to be moved, and then clicking the up or down buttons 351 and 352 to move the highlighted clip to the desired position in the scene-clips list, with each click of the up or down button moving the highlighted clip up or down by one entry. This part of the scene editor may comprise instruction sets that respond to the user's inputs on buttons 351 and 352 and the highlighting of clip entries in the scene-clips list, and updating the sequential order of data structures for the scene-clips list according to the user's inputs, and thereafter updating the display areas 320 and 330 to reflect the moves.

A "Save button" is provided at the top of the Edit-mode screen to permit the user to save the edits made to a scene. An instruction set detects the click of the save button by the user, and in response thereto saves the information held by the data structures for the scene-clips list to the data file for the scene. Any information in the preparation list is lost.

Figure 10:
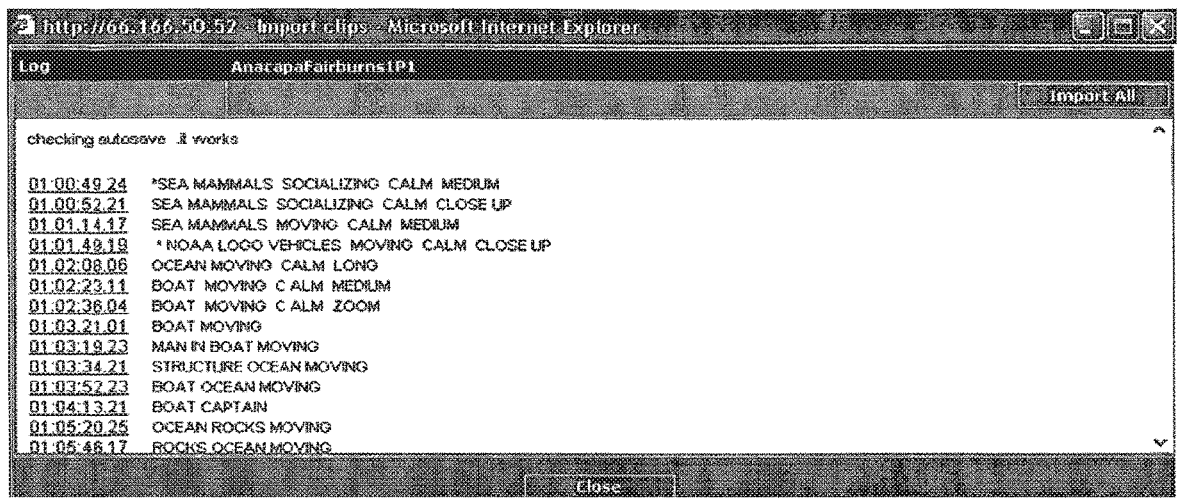
FIG. 10 shows an exemplary text data file from which scene clips are being imported from by a scene editor according to an invention of the present application.
Figure 11:
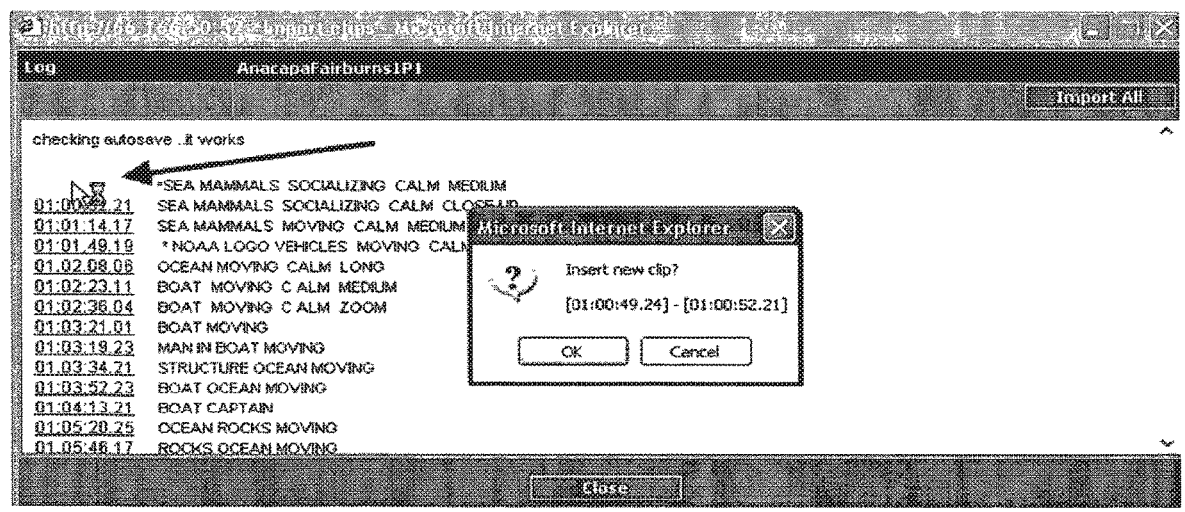
FIG. 11 shows the exemplary text data file of FIG. 10 with a secondary dialog box displayed thereon as generated by a scene editor according to an invention of the present application.

Import Mode. From Edit mode, the user can add clips to the preparation list based on the time codes in a transcription data file, log data file, notes data file, or other type of data file. By clicking on the "Import" button in the edit-mode screen (FIG. 9), the user will open up a dialog box that will enable a text data file to be selected for importation. The user then double-clicks, or otherwise selects, a data file for importation. Next, a viewing window will appear showing the contents of the data file, an example of which is shown in FIG. 10. If a user clicks on any of the time codes of the data file, a secondary dialog box will appear, as shown in FIG. 11, asking if the user would like to enter a clip starting at the selected time code, and ending at the next time code in the data file. If the user answers OK, the clip will be imported into the preparation list, with the comment field for the clip typically being idled with the text that appears between the two time codes, up to a set limit of characters (e.g., 64 characters). If the last time code in the data file is clicked, then the ending time code will not be set during the importation process, and the user will have to manually set an ending time code before transferring the clip from the preparation list to the scene-clips list. As a feature, an "Import All" button is provided on the viewing window to allow the user to import all of the time codes of the data file into the preparation window. This part of the scene editor may comprise instruction sets that respond to the user's request to open a text data file, that open the requested data file in a web page, that respond to a user clicking on a timestamp hyperlink and find the time code of that hyperlink and the time code of the next timestamp hyperlink in the file (or setting a blank value if none is found), that present a secondary dialog box showing the start and end times of the clip to be imported with a query to the user to either OK the importation of the clip to the preparation list or escape from the importation, and that enter a new data structure for a clip in the preparation list if the user approves of the importation. The latter task uses the two time codes as the starting and ending time points for the newly added clip, and the text between the two timestamp hyperlinks as the comment field for the clip. In addition, the scene editor comprises instructions that are responsive to a user clicking on the "Import All" button, and that perform the above steps in tandem for all of the timestamp hyperlinks found in the text data file.

The above instruction sets that direct a data processor (such as processor 110) to perform the above tasks of the scene editor are illustrated in FIG. 12 as being embodied on a computer-readable media. All of the computer-readable mediums disclosed herein and recited in the claims cover all forms from which a data processor may read the instructions to perform the tasks. Exemplary medium include, but are not limited to, disk drives, tape, volatile memory, non-volatile memory, CDs, DVDs, bit streams transmitted over networks, the Internet, and the like.

Storyboard Editor. The ability to enable a user to easily compose scenes from base media files will create a need for the user to readily organize the composed scenes into acts and episodes, with each episode comprising one or more acts. It may be appreciated that the term "episode" may go by other names, such as "story" or "segment," and that the term "act" may also go by other names. As indicated above, a storyboard can be run on the configuration shown for multipurpose player 100 in FIG. 1, but with a different group of instruction sets. In preferred embodiments, the storybook editor comprises a wrapper of instruction sets, which may call a dependent instance of a media player as an option. In further preferred embodiments, the storybook editor is downloadable into a web browser. The tasks of an exemplary storybook editor are described below, where each task is implemented by a respective set of instructions that directs a data processor (e.g., processor 110) to perform the corresponding tasks. In view of the present description, it will be well within the ability of one of ordinary skill in the computer arts to construct these instruction sets without undue experimentation.

Figure 13:
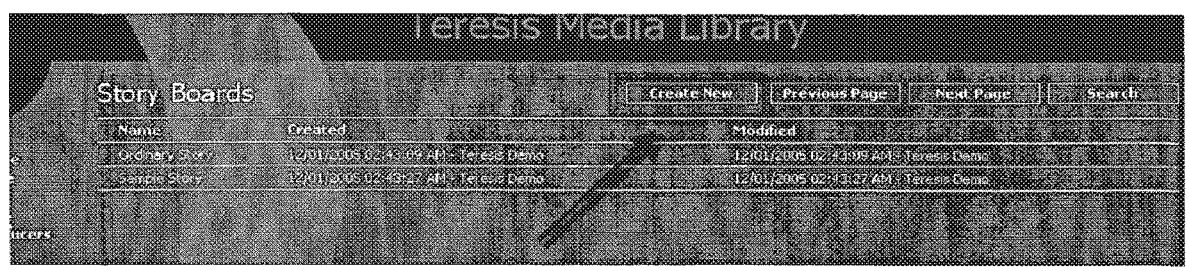
FIG. 13 is a page of a storybook editor according to an invention of the present application.

Exemplary storybook editors according to the present invention comprise a main viewing page that lists all of the user's scenes, an example of which is shown in FIG. 13. The screen presents a list of storybooks available to the user, with each storybook entry providing the name given to the storybook by the user, the dates on which the storybook was created and last modified, and navigation buttons that allow the user to page through the available storybooks, and to search the name fields of the available storybooks. It also provides a "Create New" button that enables the user to add a new storybook to the user's list, and a "Delete" button (not shown) to enable a user to delete a highlighted storyboard. This part of the storybook editor may be implemented by a respective set of instructions that accesses a File System for the user's storybook files, navigates through the files, and searches the file names. In preferred embodiments, this part of the storybook editor is implemented as a web page that is presented to the user, with the web page being generated by a file sewer that holds the user's storybook files in a File System. This allows the user to log into the system from anywhere in the world and work.

To view the details of a scene, the user can double-click on the name of the scene in the screen shown in FIG. 13. The storybook's name is preferably a hyperlink, which causes a new screen page to load in a browser window with the storybook's details in a storybook view screen. An example of this storybook view screen is shown in FIG. 14. It comprises "Edit" and "Delete" task buttons at the top of the screen, and the name of the scene immediately below ("Sample Story" in this example). The storybook view screen has a display area showing a table of rows and columns, where each column is an episode of the storybook, the top row lists the episodes by name, and each row below that is capable of storing a respective act for each episode. That is to say, each cell below the top row of the table is capable of storing an act of an episode. Not all episodes have the same number of acts, but for television productions, the forgoing is a common occurrence. Further, each cell of the display area is capable of storing one or more scenes, such as those composed by the above-described scene editor, with the one or more scenes comprising the act represented by the cell. Within each cell, the total running time of all the scenes of the cell is shown. For television productions, this helps the user to match the running times of each act to the allocated programming segments in the broadcast. In the top row, the production team for the episode and the running time of the episode are given along with the name identifier of the episode. Each episode's name identifier (or title) and team name is editable by the user, and the total running time of the episode is computed as the total running times of the episode's acts.

The information presented in the table display area is found in the data file for the storybook. This data file stores the number, names, and production teams of the storybook episodes, the number of acts in each episode, and optionally the running time of each episode. Also, for each act, the data tile stores the names and filenames (including directory locations) of the scenes that are assigned to each act, and optionally the total running time of each act. The storage of the running times of the acts and episodes is optional since the running times can be computed by examining the data files of the scenes of the acts in the storybook, and the running times of the episodes can be computed from the running times of their respective acts. This part of the storybook editor that provides the storybook view screen may be implemented by a respective set of instructions that accesses the File System for storybook's data file, reads the data file for the episodes and acts of the storybook, and displays this information in the above table form. The instructions may further include computing the running time of each act by accessing the data files for the scenes of each act, computing the miming time of each scene from the starting and ending time points of the clips of each scenes, and totaling up the running times of each act's scenes to provide the running time of the act; and instructions for computing the running time of each episode from the running times of its acts.

Referring to the top of the storybook view screen in FIG. 14, the user may edit the storybook by clicking on the "Edit" button, or delete the storybook by clicking on the "Delete" button. Clicking each of these buttons causes the storybook editor to execute respective sets of instructions that carry out the above respective tasks. Of these, the "Edit" button is described in greater detail. The delete task is a straightforward file management task that only involves a change to the File System, and does not require any more detail for one of ordinary skill in the art to implement it.

Clicking on the "Edit" button in the storybook view screen of FIG. 14 brings up the storybook edit screen for the storybook. The Edit button is preferably a hyperlink, which causes the edit screen to load in a browser window with the scene's details in a form that enables editing. An example of the edit screen is shown in FIG. 15. It comprises "Add Episode", "Add Act", "Save", and "Delete" task buttons at the top of the screen, the name of the storybook immediately below ("Sample Story" in this example), and the table view of the storybook below that. The information presented in the table is contained in the data file for the storybook, which is loaded into internal data structures (e.g., software objects) of the storybook editor, and displayed on the edit screen therefrom. The user can add a new episode to the story by clicking on the "Add Episode" button; the new episode will be added to the internal data structure and displayed after the rightmost column of the table with a default name, such as "Episode X," where X is the total number of episodes in the storybook. The user can double-click on an episode's name to change it, and can also double-click on an episode's production-team field to provide the name of the production team for the episode, if appropriate. The production-team field is initially set to a default value, such as "Team," upon creation of the episode. The internal data structures are changed to reflect the user's changes. When an episode is added, the cells for its acts are placed in blank states. The user can add a new act for all of the episodes by clicking on the "Add Act" button; this adds a new act row to the internal data structures and is displayed on the screen at the bottom of the table. An episode can be deleted by clicking on the "x" button in the top cell of the episode, and a row of acts can be deleted by clicking on the "x" button in the leftmost cell of the row. The internal data structures are updated to reflect the deletions. The part of the storybook editor that provides the edit screen may be implemented with the same instructions used for the view screen that execute common tasks, plus instruction sets that execute the tasks of receiving user input on making additions, deletions, and changes to the above elements of the storybook table, updating the internal data structures for the table in response to the user's inputs, and displaying updates to the table on the edit screen. In preferred embodiments, this part of the scene editor is implemented as a web page that is presented to the user, with the web page being generated by a file server that holds the storybook's data file in a File System. This enables the user to log into the system from anywhere in the world, and work.

Figure 16:
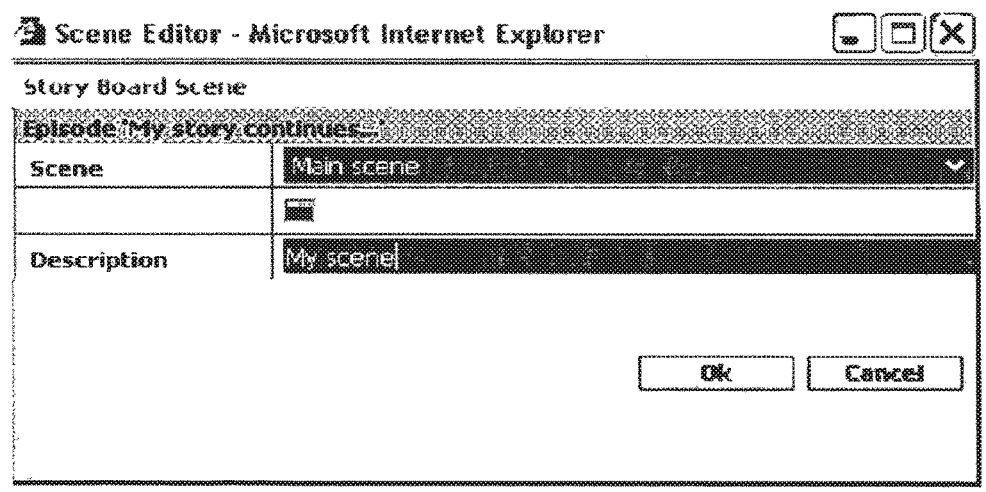
FIG. 16 is an exemplary scene selection dialog box of a storybook editor according to an invention of the present application.

Within each act cell, a "+" button is provided to enable the user to add a scene to an act. By clicking on this button, the user brings up a dialog box that allows the user to select a scene from the user's available set of scenes. An example of this is shown in FIG. 16, where a first input box is provided to enable the user to select a scene file in the File System, and a second input box is provided to allow the user to enter a description of the selected scene, the description of which will be displayed in the corresponding table cell and will be stored in the internal data structure of the table. For each act cell, the data structures are able to maintain a list of scenes (and their sequence) that have been assigned to the cell by the user. This part of the storybook editor may be implemented with instruction sets that execute the tasks of receiving user input of adding a scene, updating the internal data structures for the table in response to the user's inputs, and of displaying updates to the table on the edit screen. Also within each act cell, an "E" button is provided next to each scene to enable the user to edit the corresponding scene with the above-described scene editor. The "E" preferably comprises hyperlink that causes a web page implementation of the scene editor to be loaded into a new browser window with the scene editor set to work on the scene to which the "E" button corresponds. As another approach, the "E" button may launch a new child process that runs an instance of the scene editor in a new window of the operating system, with the scene editor set to work on the selected scene.

Referring back to FIG. 15, when a user is done editing a storyboard, the storyboard may be saved by clicking on the "Save" button at the top of the storybook edit screen. In response to clicking the "Save button," the storybook editor executes an instruction set that updates the data file for the storybook with the contents of the internal data structures. Also provided in the edit screen is a "delete" button to enable the user to delete the storyboard altogether.

The above instruction sets that direct a data processor (such as processor 110) to perform the above tasks of the scene editor are illustrated in FIG. 17 as being embodied on a computer-readable medium. All of the computer-readable mediums disclosed herein and recited in the claims cover all forms from which a data processor may read the instructions to perform the tasks. Exemplary media include, but are not limited to, disk drives, tape, volatile memory, non-volatile memory, CDs, DVDs, bit streams transmitted over networks, the Internet, and the like.

While the present inventions have been particularly described with respect to the illustrated embodiments, it will be appreciated that various alterations, modifications and adaptations may be made based on the present disclosure, and are intended to be within the scope of the present inventions. While the inventions have been described in connection with what are presently considered to be the most practical and preferred embodiments, it is to be understood that the present inventions are not limited to the disclosed embodiments but, on the contrary, are intended to cover various modifications and equivalent arrangements included within the scope of the appended claims.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A computer system to facilitate video editing comprising a computer having non-transitory computer readable medium for storing machine instructions that are to be executed by the computer, the computer system comprising:
   a media player;
   a text-editor; and
   a wrapper program comprising:
      a first set of machine instructions configured to establish a graphical user-interface container, the container defining a first area including the media player and a second area including a text-editor; and
      a second set of machine instructions configured to display text in the text-editor and a corresponding media file in the media player, the text-editor including text and hyperlinks that generate a link-clicked event such that when the hyperlink is clicked the text-editor passes information to the wrapper program and the wrapper program issues a command to the media player to set the media file based on the information.

2. The computer system of claim 1, wherein the information includes a timecode and the media file is set to the timecode.

3. The computer system of claim 1, wherein the hyperlink is a time-stamp hyperlink.

4. The computer system of claim 1, wherein the command is an API command.

5. The computer system of claim 1, wherein the wrapper program is configured to scan the text file to detect time codes and to convert each time code to a hyperlink.

6. The computer system of claim 1, wherein the wrapper program executes a jump function after receiving the information.

7. A wrapper program for coordinating tasks between a media player and a text-editor, the wrapper program embodied on a non-transitory computer-readable medium for storing machine instructions that when executed by a processor the instructions perform the steps of:
  defining a graphical user-interface container having a first area and a second area;
  starting a media player in the first area;
  staring a text-editor in the second area;
  opening a media file in the media player;
  displaying text corresponding to the media file in the text-editor;
  receiving a link-clicked event from the text-editor; and
  generating a request to the media player to set a current playing time to a time code.

8. The wrapper program of claim 7, wherein the graphical user-interface is defined within a browser window.

9. The wrapper program of claim 7, wherein the text file includes one or more hyperlinks configured to generate the link-clicked event.

10. The wrapper program of claim 9, wherein the one or more hyperlinks include a timestamp hyperlink.

11. The wrapper program of claim 10, wherein the hyperlink is passed to an operating system.

12. The wrapper program of claim 7, wherein text-editor passes the time code via linked-clicked event such that the time code is received and sent to the media player.

13. The wrapper program of claim 7, wherein the wrapper program is loaded over the Internet.

14. A method of video editing comprising the steps of:
  establishing, via a wrapper program, a graphical user-interface container, the container defining a first area for displaying a media player and a second area for displaying a text-editor;
  displaying text in the text-editor and a corresponding media file in the media player via one or more commands from the wrapper program to the text-editor and the media player, the text including a link that generates a link-clicked event in the text-editor;
  receiving, via the wrapper program, a time code from the text-editor when a user activates the link-clicked event; and
  issuing additional commands to the media player from the wrapper program after receiving the time code, the additional commands directing the media player to set the media file to the timecode.

15. The method of claim 14, wherein the wrapper program is accessed via the Internet.

16. The method of claim 14, wherein the link-clicked event is activated by clicking a hyperlink.

17. The method of claim 16, wherein the hyperlink is a time-stamp hyperlink.

18. The method of claim 14, further comprising converting a selected text to a hyperlink by issuing a link-conversion command.

19. The method of claim 14, wherein the timecode corresponds to a frame of the media file.

20. The method of claim 4, wherein the wrapper program is configured to open a text file.

* * * * *

UNITED STATES PATENT AND TRADEMARK OFFICE
CERTIFICATE OF CORRECTION

PATENT NO. : 11,467,706 B2  
APPLICATION NO. : 16/723591  
DATED : October 11, 2022  
INVENTOR(S) : Keri Dewitt et al.

Page 1 of 1

It is certified that error appears in the above-identified patent and that said Letters Patent is hereby corrected as shown below:

In the Claims

Column 30, Line 31, Claim 20:  
After "The method of claim"  
Delete "4" and  
Insert -- 14 --.

Signed and Sealed this  
Thirtieth Day of January, 2024

Katherine Kelly Vidal  
*Director of the United States Patent and Trademark Office*